US008420219B2

(12) United States Patent
Vandermeulen et al.

(10) Patent No.: US 8,420,219 B2
(45) Date of Patent: Apr. 16, 2013

(54) METHOD FOR THE APPLICATION OF CORROSION-RESISTANT LAYERS TO METALLIC SURFACES

(75) Inventors: Guido Vandermeulen, Ilvesheim (DE); Alexander Göthlich, Mannheim (DE); Markus Hickl, Münster (DE); Michael Dornbusch, Münster (DE); Monica Fernandez Gonzalez, Frankenthal (DE); Konrad Roschmann, Ludwigshafen-Edigheim (DE); Hermann Bergmann, Singapore (SG)

(73) Assignee: BASF SE (DE)

( * ) Notice: Subject to any disclaimer, the term of this patent is extended or adjusted under 35 U.S.C. 154(b) by 925 days.

(21) Appl. No.: 12/298,230

(22) PCT Filed: Apr. 18, 2007

(86) PCT No.: PCT/EP2007/053757
§ 371 (c)(1),
(2), (4) Date: Oct. 23, 2008

(87) PCT Pub. No.: WO2007/125038
PCT Pub. Date: Nov. 8, 2007

(65) Prior Publication Data
US 2009/0123742 A1 May 14, 2009

(30) Foreign Application Priority Data
Apr. 26, 2006 (EP) .................................. 06113119

(51) Int. Cl.
*B32B 15/04* (2006.01)
*B32B 27/00* (2006.01)
*C08L 33/08* (2006.01)
*C08L 75/04* (2006.01)
*C08F 226/06* (2006.01)
*B05D 3/02* (2006.01)
*B05D 3/00* (2006.01)

(52) U.S. Cl.
USPC ........... 428/457; 428/339; 428/458; 524/502; 524/523; 524/525; 524/507; 427/385.5; 427/327; 526/263

(58) Field of Classification Search ................. 428/339, 428/457, 458; 524/502, 523, 525, 507; 526/263; 427/385.5, 327
See application file for complete search history.

(56) References Cited

U.S. PATENT DOCUMENTS 3,323,980 A    6/1967  Poschmann et al.
3,454,482 A *  7/1969  Spoor et al. ................... 428/457

(Continued)

FOREIGN PATENT DOCUMENTS

| CA | 2178328 | 6/1995 |
| DE | 1223247 | 8/1966 |

(Continued)

*Primary Examiner* — Michael M Bernshteyn
(74) *Attorney, Agent, or Firm* — Novak Druce Connolly Bove + Quigg LLP

(57) ABSTRACT

Method of applying corrosion control coats, especially integrated pretreatment layers or coats for atmospheric corrosion control, to metallic surfaces, using copolymers comprising as monomeric building blocks 20% to 70% by weight of monomers containing nitrogen heterocycles, 10% to 50% by weight of monomers containing acidic groups, 10% to 50% by weight of vinylaromatic monomers, and optionally 0% to 25% by weight of further monomers. Copolymers of the stated composition, and also preparations for applying corrosion control coats.

43 Claims, 4 Drawing Sheets

Figure 4:
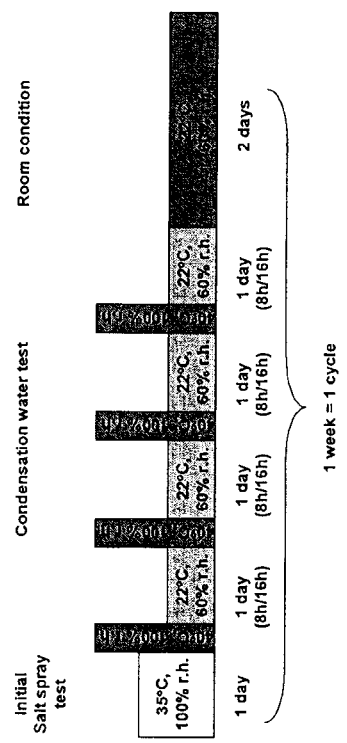

Images of the sample surface of the blank sample and coating materials with the 4, 6 and 7 (from left to right).

Blank sample    Polymer 4    Polymer 6    Polymer 7

U.S. PATENT DOCUMENTS

| | | | |
|---|---|---|---|
| 4,104,227 A | | 8/1978 | Boessler et al. |
| 4,177,179 A | | 12/1979 | Kurihara et al. |
| 4,358,403 A | | 11/1982 | Distler et al. |
| 5,483,004 A | | 1/1996 | Hoffmann et al. |
| 5,602,204 A | * | 2/1997 | Harimoto et al. ............. 525/209 |
| 5,707,941 A | | 1/1998 | Häberle |
| 5,897,948 A | * | 4/1999 | Sakon et al. ................ 428/328 |
| 6,146,473 A | * | 11/2000 | Shibata et al. ................ 148/251 |
| 6,348,528 B1 | | 2/2002 | Schlarb et al. |
| 6,583,214 B1 | | 6/2003 | Haeberle et al. |
| 6,756,459 B2 | * | 6/2004 | Larson et al. ................ 526/274 |
| 2001/0002274 A1 | | 5/2001 | Lessmeister et al. |
| 2001/0046555 A1 | | 11/2001 | Lessmeister et al. |
| 2006/0162820 A1 | | 7/2006 | Dietsche et al. |
| 2006/0211815 A1 | | 9/2006 | Licht et al. |
| 2007/0166548 A1 | | 7/2007 | Gruber et al. |

FOREIGN PATENT DOCUMENTS

| | | | |
|---|---|---|---|
| DE | 1276260 | | 8/1968 |
| DE | 2547970 A1 | | 5/1977 |
| DE | 4342281 | | 6/1995 |
| DE | 16932426 A1 | | 1/1998 |
| DE | 19914896 A1 | | 10/2000 |
| EP | 0047380 A1 | | 3/1982 |
| EP | 0157133 A1 | | 10/1985 |
| EP | 0699632 A1 | | 3/1996 |
| EP | 0776992 A1 | | 6/1997 |
| EP | 1288338 A1 | | 3/2003 |
| JP | 7037034 | | 2/1995 |
| JP | 2000-000519 A | | 1/2000 |
| JP | 2001-215712 A | | 8/2001 |
| JP | 2001215712 A | * | 8/2001 |
| WO | WO-93/07190 A1 | | 4/1993 |
| WO | WO 9307190 A1 | * | 4/1993 |
| WO | WO 9515986 A1 | * | 6/1995 |
| WO | WO-99/46337 A1 | | 6/1999 |
| WO | WO-2004/081128 A2 | | 9/2004 |
| WO | WO-2004/101638 A1 | | 11/2004 |
| WO | WO-2005/005565 A1 | | 1/2005 |
| WO | WO-2005/078025 A1 | | 8/2005 |
| WO | WO-2005/080484 A1 | | 9/2005 |
| WO | WO 200481128 A2 | * | 9/2005 |
| WO | WO-2006/084879 A1 | | 8/2006 |

* cited by examiner

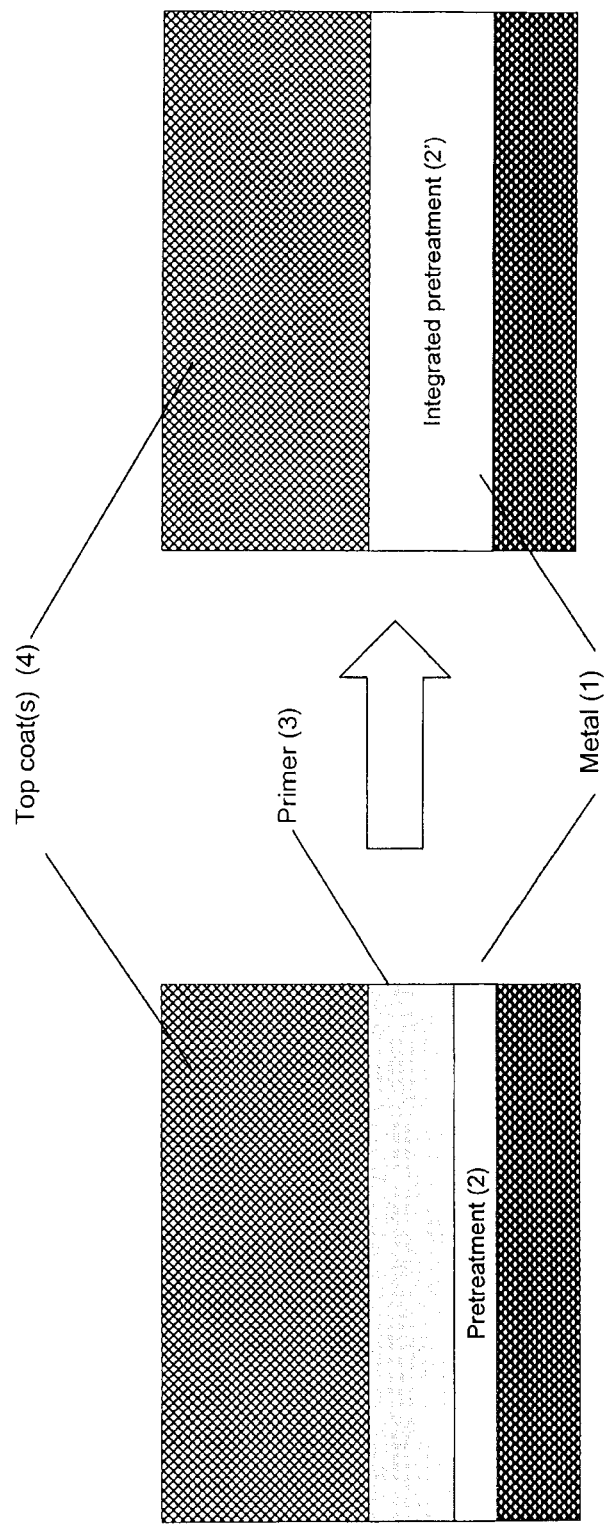

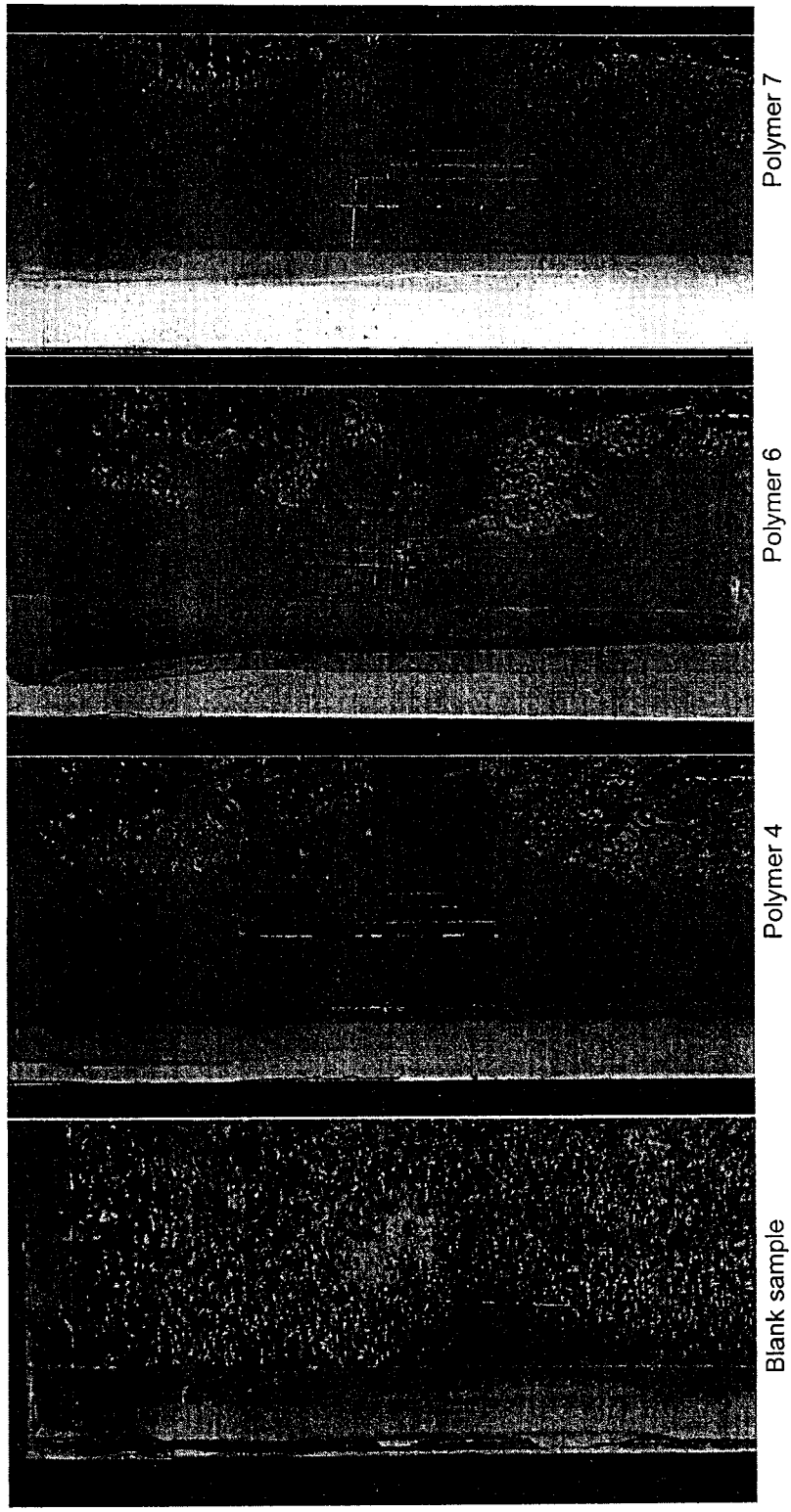
Figure 3: Images of the sample surface of the blank sample and coating materials with the 4, 6 and 7 (from left to right).

METHOD FOR THE APPLICATION OF CORROSION-RESISTANT LAYERS TO METALLIC SURFACES

RELATED APPLICATIONS

This application is a national stage application (under 35 U.S.C. §371) of PCT/EP2007/053757, filed Apr. 18, 2007, which claims benefit of European Application No. 06113119.9, filed Apr. 26, 2006.

The present invention relates to a method of applying corrosion control coats, especially integrated pretreatment layers or coats for atmospheric corrosion control, to metallic surfaces, using copolymers containing as monomeric building blocks monomers containing nitrogen heterocycles, monomers containing acidic groups, and vinylaromatic monomers. It relates, furthermore, to the said copolymers and also to preparations for applying corrosion control coats.

Metallic articles, components, structures or metal constructions made from typical metallic materials must as a general rule be protected from corrosion. An important position in corrosion control is occupied here by coatings which shield the metallic surface from the effects of corrosive media. Suitable corrosion control coating systems typically comprise one or more binders, anticorrosion pigments, organic corrosion inhibitors if appropriate, and further adjuvants and additives.

There are a variety of techniques which can be employed for applying corrosion control coats.

For producing thin-walled metallic workpieces such as, for example, automobile bodies, instrument paneling, or exterior architectural paneling, suitable metal sheets are shaped and joined by means of appropriate techniques. The raw material for this purpose typically comprises long metal strips which are produced by rolling of the metal and which for the purposes of storage and transportation are wound up to form rolls (referred to as coils).

Whereas in the past the corrosion control treatment was carried out essentially on the finished metallic workpiece—an automobile body assembled by welding, for example—in more recent times the corrosion control treatment has increasingly been performed on the coil metal itself, by means of coil coating.

Coil coating is the continuous coating of metal strips, or coils, of aluminum or steel for example, with suitable coating materials on a coil coating line.

In the course of coil coating operation, the metal coils are generally cleaned first of all, where necessary. The actual corrosion control treatment in a conventional coil coating operation is in two stages:

first of all a thin pretreatment layer (<1 µm) is applied. The purpose of this layer is to increase the corrosion resistance and it serves to improve the adhesion of subsequent coating films to the metal surface. Pretreatment baths known for this purpose include those containing Cr(VI), those containing Cr(III), and also those free from chromate.

After that a primer coat is applied. The dry film thickness is typically about 5-8 µm. For this purpose it is usual to use suitable baking varnishes and/or photochemically curing coating materials.

Atop the metal coil thus pretreated it is possible, depending on intended use, to apply one or more top coats. This may take place still on the coil coating line and/or else not until a later point in time.

The layer construction of a metal coil coated in this way is shown schematically in FIG. 1. Applied atop the metal (1) are a conventional pretreatment layer (2), a primer coat (3), and one or more different top coat films (4). The two-stage coating of the metal coils with the pretreatment layer (2) and a primer coat (3) is very costly and inconvenient. Moreover, within the market, there is increasing demand for Cr(VI) free systems for corrosion control. It has therefore been a worthwhile aim to apply, instead of the pretreatment layer (2) and the organic primer (3), a single, integrated pretreatment layer (2'), which takes on the functions of both layers. A layer construction of this kind is shown by way of example and schematically in FIG. 2. The production of a coated metal coil is significantly simplified by a single-stage operation of this kind.

In the case of stationary metallic constructions such as buildings, bridges, power masts, oil tanks, pipelines, power stations or chemical plant, for example, the corrosion control coatings cannot of course be applied in the manner described, but instead are usually applied in situ by brushing or spraying. The drying and curing of corrosion control coatings of this kind are accomplished under atmospheric conditions, in other words at ambient temperature and in the presence of air and usual atmospheric humidity. This type of corrosion control is also referred to as atmospheric corrosion control and frequently, depending on the nature of the corrosion exposure, as light, medium or heavy duty corrosion control.

WO 2004/81128 discloses the use of polymers comprising more than 45% to 100% by weight of vinylimidazole for passivating metal surfaces. The polymers may further comprise up to 50% by weight of N-vinyl lactams, vinyl heteroaromatics, vinyl esters or $C_1$ to $C_{10}$ (meth)acrylates and also 0% to 5% by weight of monoethylenically unsaturated monomers containing acid groups.

EP-A 1 288 338 discloses copolymers of maleic acid and/or maleic anhydride and olefins. The maleic acid units can be functionalized subsequently with imidazole units in a polymer-analogous reaction with 1-(3-aminopropyl)imidazole. The polymers can be used as corrosion inhibitors in aqueous systems.

JA-70 37034 discloses copolymers of 2% to 40% by weight of monomers containing imidazole groups, 3% to 50% by weight of monomers containing carboxyl groups, and 2% to 50% by weight of monomers containing OH groups. In addition it is possible for other monomers to be present as well, acrylates for example. The polymers can be used for coating, especially in electrodeposition coating materials.

WO 93/07190 discloses copolymers of 1% to 20% by weight of vinylimidazole and/or dimethylaminopropylmethacrylamide, 0% to 50% by weight of monomers containing OH groups, 0% to 50% by weight of monomers containing carboxyl groups, and 30% to 85% by weight of other ethylenically unsaturated monomers. The copolymers can be used for example as binders in automotive refinish materials.

JP-A 2001-215712 discloses copolymers of acidic, basic monomers and also, in addition, monomers based on alkyl- and/or aryl-ammonium or phosphonium salts. Specifically disclosed are a copolymer of 70% by weight N-vinylimidazole, 10% by weight methacrylic acid, and 20% by weight vinylbenzyltributylphosphonium chloride, and a copolymer of 50% by weight vinylimidazole, 40% by weight vinylbenzylphosphonic acid, and 20% by weight vinylbenzyltriethylammonium chloride. Vinylaromatic hydrocarbons as comonomers are not disclosed.

DE-A 25 47 970 discloses copolymers as binders for paints which comprise 0.5% to 5% by weight of vinylimidazole and also, in addition, (meth)acrylic esters, styrene, vinyl esters or ethylene.

DE 1 223 247 discloses water-soluble copolymers for sizing paper that comprise 5% to 95% by weight of vinylimidazole and also 95% to 5% by weight of other comonomers, acrylic acid for example.

None of the documents cited discloses, however, the copolymers defined at the outset or their use in methods of applying corrosion control coats, and particularly no continuous methods of applying integrated corrosion control coats to coil metals.

WO 2005/078025 discloses integrated pretreatment layers and also a method of applying integrated pretreatment layers which comprise dithiophosphoric esters as corrosion preventatives. Our application WO 2006/084879, unpublished as yet, discloses a method of applying integrated pretreatment layers which comprise dithiophosphinic acids as corrosion preventatives. The use of polymeric corrosion preventatives is not disclosed.

It was an object of the invention to provide an improved method of applying corrosion control coats, especially integrated pretreatment layers and atmospheric corrosion control coats, improved corrosion control coats, and improved corrosion preventatives.

Found accordingly has been a method of applying corrosion control coats to metallic surfaces by treating the metallic surface with a preparation at least comprising a curable or crosslinkable binder system (A), a component (B) selected from the group of finely divided fillers, pigments or dyes, and a polymeric corrosion preventative (C), wherein said polymeric corrosion preventative is a copolymer (C) synthesized from the following monomeric building blocks:

(C1) 20% to 70% by weight of at least one monoethylenically unsaturated monomer which contains a 5- or 6-membered aromatic nitrogen heterocycle having 1 to 3 nitrogen atoms,
(C2) 10% to 50% by weight of at least one monoethylenically unsaturated monomer which comprises at least one acid group,
(C3) 10% to 50 by weight of at least one monoethylenically unsaturated aromatic hydrocarbon, and
(C4) optionally 0% to 25% by weight of further, non-(C1 to C3) ethylenically unsaturated monomers,
the amount being based in each case on the total amount of all monomeric structural units in the copolymer.

In one preferred embodiment of the invention the method in question is a method of applying integrated pretreatment layers, which are applied using a thermally and/or photochemically crosslinkable binder system, and thereafter the layer is crosslinked thermally and/or photochemically.

In a further preferred embodiment of the invention the method is a method of atmospheric corrosion control, using a binder system which is curable under atmospheric conditions, and the layer is cured following application under atmospheric conditions.

In a further aspect the invention provides copolymers of the definition given at the outset, and also formulations for applying corrosion control coats which comprise the copolymers specified at the outset.

Surprisingly it has been found that the copolymers of the invention lead to improved corrosion control coats. The copolymers impart effective corrosion control and effective adhesion to the surface and may also significantly improve the mechanical properties of the coatings. Through incorporation of additional hydroxyl and/or amino functionalities it is possible to enhance the attachment of the copolymers to the binder system. Moreover, the copolymer has a certain amphilicity, and is thus capable of stabilizing interfaces such as metal/coating, coating/environment, and hydrophobic-hydrophilic interfaces in the coating material.

LIST OF FIGURES

FIG. 1: section through a coated metal coil with prior-art two-stage pretreatment FIG. 2: section through coated metal coil with inventive integrated pretreatment.

FIG. 3: Photographs of samples surface of the blank sample end of coating materials with polymers 4, 6, and 7 as set forth below.

FIG. 4: Depiction of a cycle of a test of corrosion inhibition effect.

Figure 5:
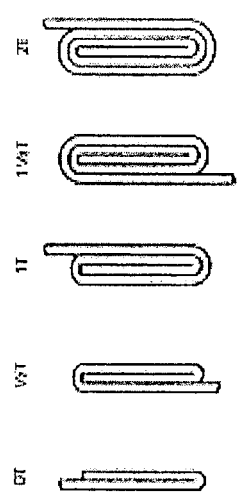

FIG. 5: Diagram of test strips cut from coated metal and bent in stages.

Details of the invention now follow.

Copolymer (C)

The inventive copolymer (C) is synthesized from the monomers (C1), (C2), (C3) and, optionally, (C4), it of course also being possible to use in each case two or more different monomers (C1), (C2), (C3) and/or, optionally, (C4). Apart from (C1), (C2), (C3) and, if appropriate, (C4), there are no other monomers present.

Monomers (C1)

The monomers (C1) comprise at least one monoethylenically unsaturated monomer which contains a 5- or 6-membered aromatic nitrogen heterocycle having 1 to 3 nitrogen atoms. In addition to the nitrogen atoms there may also, optionally, be further heteroatoms present in the ring.

Examples of 6-membered aromatic heterocycles comprise, in particular, pyridine or pyridine derivates such as 2-vinylpyridine or 4-vinylpyridine. Examples of 5-membered aromatic heterocycles comprise pyrrole, pyrazole; imidazole, 1,2,3-triazole or 1,2,4-triazole, such as 1-vinylimidazole, 4-vinylimidazole, 1-vinylpyrazole or 1-vinyl-1,2,4-triazole, for example.

The monomers may on the one hand be monomers of the kind which result from the nitrogen heterocycles by substitution of a ring H atom by a vinyl group. Alternatively the monoethylenically unsaturated group may be joined to the heterocycle via a linking group.

The nitrogen heterocycle of the monomers (C1) is preferably vinylimidazole or a vinylimidazole derivative of the general formula (I).

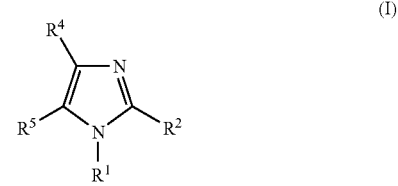

In this formula one of the radicals, $R^1$, $R^2$, $R^4$ or $R^5$, is a vinyl group. Preferably $R^1$ or $R^4$ is a vinyl group, more preferably $R^1$. The radicals which are not a vinyl group may independently of one another be H or a $C_1$ to $C_{12}$ alkyl group, preferably a $C_1$ to $C_6$ alkyl group, and more preferably a methyl group. Preferably 2 of the remaining 3 radicals are H and one is a $C_1$ to $C_{12}$ alkyl group, preferably a $C_1$ to $C_6$ alkyl group, and more preferably a methyl group. Examples of particularly preferred compounds comprise 1-vinylimidazole, 1-vinyl-2-methylimidazole or 4-vinylimidazole.

With very particular preference, monomer (C1) comprises 1-vinylimidazole.

The amount of all monomers (C1) together in accordance with the invention is 20% to 70% by weight, based on the total amount of all monomeric structural units in copolymer (C). Preferably the amount is 25% to 65%, more preferably 30% to 60%, and very preferably 35% to 55% by weight.

Monomers (C2)

The monomers (C2) are monoethylenically unsaturated monomers which contain at least one acid group. The acid group may be in the form of a free acid group or else wholly or partly in salt form.

The acid groups preferably comprise at least one selected from the group of carboxyl groups, phosphoric acid groups, phosphonic acid groups, and sulfonic acid groups.

Examples of monomers with COOH groups comprise (meth)acrylic acid, vinyl acetic acid, crotonic acid or isocrotonic acid. The monomers in question may also be monomers having 2 COOH groups. Examples comprise maleic acid, fumaric acid, methylfumaric acid, methylmaleic acid, dimethylmaleic acid, and, if appropriate, the corresponding cyclic anhydrides. Preferred monomers with COOH groups are (meth)acrylic acid and also itaconic acid.

Examples of monomers which contain phosphoric and/or phosphonic acid groups comprise vinylphosphonic acid, monovinyl phosphate, allylphosphonic acid, monoallyl phosphate, 3-butenylphosphonic acid, mono-3-butenyl phosphate, mono(4-vinyloxybutyl) phosphate, phosphonoxyethyl acrylate, phosphonoxyethyl methacrylate, mono-(2-hydroxy-3-vinyloxypropyl) phosphate, mono-(1-phosphonoxymethyl-2-vinyloxyethyl) phosphate, mono (3-allyloxy-2-hydroxypropyl) phosphate, mono-2-(allylox-1-phosphonoxymethylethyl) phosphate, 2-hydroxy-4-vinyloxymethyl-1,3,2-dioxaphosphole or 2-hydroxy-4-allyloxymethyl-1,3,2-dioxaphosphole. A preferred monomer containing phosphoric and/or phosphonic acid groups is vinylphosphonic acid.

Examples of monomers containing sulfonic acid groups comprise allylsulfonic acid, methallylsulfonic acid, styrenesulfonate, vinylsulfonic acid, allyloxybenzenesulfonic acid, 2-acrylamido-2-methylpropanesulfonic acid or 2-(methacryloyl)ethylsulfonic acid. A preferred monomer containing sulfonic acid groups is acrylamido-2-methylpropanesulfonic acid.

For methods of applying integrated corrosion control coats, particular preference is given to using, as monomer (C2), monomers containing phosphoric and/or phosphonic acid groups, with very particular preference being given to vinylphosphonic acid.

In the case of atmospheric corrosion control, a particularly preferred monomer (C2) used comprises monomers containing COOH and sulfonic acid groups, with very particular preference being given to itaconic acid.

The amount of all monomers (C2) together is in accordance with the invention 10% to 50% by weight, based on the total amount of all monomeric structural units in copolymer (C). Preferably the amount is 15% to 45%, more preferably 20% to 40%, and very preferably 22% to 36% by weight.

Monomers (C3)

The monomers (C3) comprise at least one monoethylenically unsaturated aromatic hydrocarbon.

Examples of hydrocarbons of this kind comprise, in particular, styrene and also derivatives of styrene, such as α-methylstyrene, 2-vinyltoluene, 4-vinyltoluene or allylbenzene.

With particular preference the monomer (C3) comprises styrene.

The amount of all monomers (C3) together is in accordance with the invention 10% to 50% by weight, based on the total amount of all monomeric structural units in copolymer (C). Preferably the amount is 15% to 45%, more preferably 20% to 40%, and very preferably 25% to 35% by weight.

Monomers (C4)

The copolymers (C) used in accordance with the invention may further comprise, as structural units, 0% to 25%, preferably 0% to 15%, and more preferably 0% to 10% by weight of other ethylenically unsaturated monomers (C4), which are different from but copolymerizable with (C1), (C2), and (C3). Monomers of this kind can be used—where necessary—to fine-tune the properties of the copolymer (C).

The monomers (C4) are preferably monoethylenically unsaturated monomers different than the monomers (C1) to (C3). The skilled worker will make an appropriate selection in terms of the nature and amount of such monomers (C) in accordance with the desired properties and the desired application of the polymer.

Examples of monomers (C) comprise $C_1$ to $C_{18}$ alkyl esters of (meth)acrylic acid, such as methyl (meth)acrylate, ethyl (meth)acrylate, butyl (meth)acrylate or 2-ethylhexyl (meth)acrylate. Further examples comprise vinyl ethers or allyl ethers such as methyl vinyl ether, ethyl vinyl ether, for example, or vinyl esters such as vinyl acetate or vinyl propionate, for example. In addition it is also possible to use basic monomers such as acrylamides or alkyl-substituted acrylamides, such as acrylamide, methacrylamide, N-tert-butylacrylamide or N-methyl(meth)acrylamide, for example.

In one particularly preferred embodiment of the invention monomer (C4) comprises a monomer containing OH groups. Such monomers may in particular be $C_1$ to $C_4$ hydroxyalkyl esters of (meth)acrylic acid, such as 2-hydroxyethyl (meth)acrylate, 2-hydroxypropyl (meth)acrylate or butane-1,4-diol monoacrylate, for example. 2-Hydroxyethyl acrylate is preferred.

With further preference the monomer in question may be a monomer containing —$NH_2$ groups, or a monomer which is able on hydrolysis to form —$NH_2$ groups. An example of one such monomer is N-vinylformamide.

OH and/or $NH_2$ groups may serve for better attachment of the copolymer (C) to the binder system, by reacting with suitable components of the binder system.

The amount of monomers (C4), where present, is generally 0.1% to 25% by weight, based on the total amount of all monomeric structural units in copolymer (C). Preferably the amount is 1% to 15%, more preferably 2% to 10%, and very preferably 3% to 7% by weight.

The monomers (C4) may also be crosslinking monomers having two or more isolated ethylenically unsaturated double bonds. Examples comprise di- and/or poly(meth)acrylates such as ethylene glycol di(meth)acrylate or butane-1,4-diol di(meth)acrylate, di-, tri- or tetraethylene glycol di(meth)acrylate or trimethylolpropane tri(meth)acrylate. However, the copolymers (C) ought not to be crosslinked too greatly. If crosslinking monomers are present, their amount ought generally not to exceed 4% by weight with respect to the sum of all of the monomers, preferably 3% by weight, and more preferably 2% by weight.

Preparation of the Copolymers (C)

The preparation of the copolymers (C) used in accordance with the invention is performed preferably by means of free-radical polymerization. The conduct of a free-radical polymerization, including required apparatus, is known in principle to the skilled worker. The polymerization is preferably carried out using thermally decomposing polymerization initiators. With preference it is possible to use peroxides as thermal initiators. The polymerization can of course also be performed photochemically.

Solvents which can be used include, preferably, monoalcohols. Examples of suitable monoalcohols comprise C1 to C8 alkoxy alcohols and, in particular, 2-butoxyethanol.

The free-radical polymerization with thermal initiators can be performed at 60 to 250° C., preferably 70 to 220° C., more preferably at 80 to 200° C., and in particular at 100 to 170° C. The amount of initiator is 0.1% to 15% by weight based on the amount of the monomers, preferably 3% to 12% and more preferably 5% to 9% by weight. In general an amount of approximately 6% by weight is advisable. The polymerization time is typically 1 to 40 h, preferably 3 to 25 h, and more preferably 7 to 15 h. If necessary, the copolymers can be isolated from the solvent by methods known to the skilled worker.

The acidic groups of the polymer can also be wholly or, preferably, partly neutralized before, during or after the polymerization. Partial neutralization leads to improved incorporation of the monomers into the polymer; in other words, polymers of low residual monomer content are obtained.

Examples of suitable bases for neutralizing comprise in particular linear, cyclic and/or branched $C_1$-$C_8$ mono-, di-, and trialkylamines, linear or branched $C_1$-$C_8$ mono-, di- or trialkanolamines, especially mono-, di- or trialkanolamines, linear or branched $C_1$-$C_8$ alkyl ethers of linear or branched $C_1$-$C_8$ mono-, di- or trialkanolamines, oligoamines and polyamines such as diethylenetriamine, for example.

The neutralization may be performed preferably before or during the polymerization. The optimum amount of base is guided by the particular acidic monomer employed. Depending on the acidic monomer used, the degree of neutralization during the polymerization can be set such that the optimum residual monomer content is obtained. When using monomers with phosphoric and/or phosphonic acid groups, especially vinylphosphonic acid, amounts of 5 to 100 mol % of base, preferably 15 to 75 mol % and more preferably 25 mol %, based on the amount employed, produce the best residual monomer content. In the case where itaconic acid is used, 0 to 40 mol % of base, preferably 0 to 25 mol %, based on the amount employed, produce the best residual monomer content.

The organic solutions of the modified copolymers that are obtained can be used directly for formulating organic crosslinkable preparations. Alternatively, of course, the polymer can also be isolated from these solutions by methods known to the skilled worker.

For incorporation into aqueous formulations it is possible appropriately to add water to the solution and to separate off the organic solvent by means of methods known to the skilled worker.

The molecular weight $M_w$ of the copolymer is selected by the skilled worker in accordance with the desired end use. An $M_w$ which has proven appropriate is one from 3000 g/mol to 1 000 000 g/mol, preferably 4000 to 200 000 g/mol, and more preferably 5000 to 1000 000 g/mol.

Method of Applying Corrosion Control Coats

By means of the method of the invention it is possible to protect in principle any metallic articles against corrosion, by treating the metallic surface with a preparation comprising at least one curable and/or crosslinkable binder system (A), a component (B) selected from the group of finely divided fillers, pigments or dyes, and a copolymer (C). The formulation may further comprise, optionally, a solvent or a solvent system (D) in which the components are in solution or dispersion. Preferably there is a solvent present.

It is possible in principle to coat all kinds of metals. Preferably, however, the substrates in question are base metals or alloys which are typically used as metallic construction materials and which require corrosion protection. Examples comprise, in particular, iron, steel, zinc, zinc alloys, aluminum or aluminum alloys.

Binder systems (A), components (B), and suitable solvents for formulating corrosion control formulations are known to the skilled worker. He or she will make an appropriate selection in accordance with the desired properties for the coat. The surface can be coated by means of customary techniques familiar to the skilled worker, such as by spraying, brushing or coil coating, for example.

Depending on the nature of the metallic surface and/or the metallic article, there are in particular two different preferred embodiments of the method of the invention that are appropriate.

Integrated Corrosion Control

The advantages of the copolymers (C) used in accordance with the invention are manifested in particular when the corrosion control coats are applied using crosslinkable binder systems whose curing is performed at elevated temperatures, in suitable ovens for example, or photochemically, using suitable radiation sources. This technique is especially suitable for two-dimensional metallic workpieces, such as sheets or metal coils, for example, or else for shaped but portable metallic workpieces, such as automobile bodies or bodywork parts, for example.

In one particularly preferred embodiment of the invention the method of the invention can be used to provide metallic surfaces with an integrated pretreatment layer. The integrated pretreatment layers of the invention have a thickness of 1 to 25 µm.

The term "integrated pretreatment layer" for the purposes of this invention means that the coating of the invention is applied directly to the metal surface without any corrosion-inhibiting pretreatment such as passivating, application of a conversion coat or phosphating, and in particular no treatment with Cr(VI) compounds, being performed beforehand. The integrated pretreatment layer combines the passivating layer with the organic primer coat and also, if appropriate, further coats in a single layer. The term "metal surface" is of course not to be equated here with absolutely bare metal, but instead denotes the surface which inevitably forms when metal is typically employed in an atmospheric environment or else when the metal is cleaned prior to the application of the integrated pretreatment layer. The actual metal, for example, may carry a moisture film or a thin skin of oxide or of oxide hydrate.

The surface of metallic articles of arbitrary shape may in principle be provided with integrated pretreatment layers. These may be articles composed entirely of metals; alternatively, the articles may be only coated with metals and may themselves be composed of other materials: polymers or composites, for example.

With particular advantage, however, the articles in question may be sheetlike shaped articles with a metallic surface, i.e., articles whose thickness is considerably less than their extent in the other dimensions. Examples include panels, foils, sheets, and, in particular, metal coils, and also metallic-surfaced components manufactured from them—by parting, reshaping and joining, for example—such as automobile bodies or parts thereof, for example. The thickness, or wall thickness, of metallic materials of this kind is preferably less than 4 mm and for example 0.25 to 2 mm.

The process of the invention can be employed with preference in order to apply integrated pretreatment layers to the surfaces of iron, steel, zinc, zinc alloys, aluminum or aluminum alloys. The surface in question may in particular be that of galvanized iron or steel. In one preferred embodiment of the process the surface in question is that of a coil metal, particularly of electrolytically galvanized or hot-dip-galvanized steel. A steel coil in this context may be galvanized on one side or both sides.

Zinc alloys or aluminum alloys and their use for the coating of steel are known to the skilled worker. The skilled worker selects the nature and amount of alloying constituents in accordance with the desired end application. Typical constituents of zinc alloys comprise in particular Al, Pb, Si, Mg, Sn, Cu or Cd. Typical constituents of aluminum alloys comprise in particular Mg, Mn, Si, Zn, Cr, Zr, Cu or Ti. The term "zinc alloy" is also intended to include Al/Zn alloys in which Al and Zn are present in approximately equal amount. Steel coated with alloys of this kind is available commercially. The steel itself may comprise the typical alloying components known to the skilled worker.

Atop the integrated pretreatment layer it is possible with advantage for further coating films to be applied directly, without the need for an additional organic primer coat to be applied beforehand. It will be appreciated, however, that an additional organic primer coat is possible in special cases, though preferably is absent. The nature of further coating films is guided by the use envisaged for the metal.

Binder System (A')

The preparations used in accordance with the invention for the application of integrated pretreatment layers may be preparations based on organic solvents, aqueous or pre-dominantly aqueous preparations, or solvent-free preparations. The preparations comprise at least one thermally and/or photochemically crosslinkable binder system (A'), at least one finely divided inorganic filler (B'), and at least one copolymer (C) as corrosion preventative.

The term "crosslinkable binder system" hereinbelow identifies, in a way which is known in principle, those fractions of the formulation that are responsible for the formation of a film. In the course of thermal and/or photochemical curing they form a polymeric network. They comprise thermally and/or photochemically crosslinkable components. The crosslinkable components may be of low molecular mass, oligomeric or polymeric. They have in general at least two crosslinkable groups. Crosslinkable groups may be either reactive functional groups able to react with groups of their own kind ("with themselves") or with complementary reactive functional groups. Various possible combinations are conceivable here, in a way which is known in principle. The binder system may comprise, for example, a polymeric binder which is not itself crosslinkable, and also one or more low molecular mass or oligomeric crosslinkers (V). Alternatively the polymeric binder itself may also contain crosslinkable groups which are able to react with other crosslinkable groups on the polymer and/or on a crosslinker employed additionally. With particular advantage it is also possible to use oligomers or prepolymers which contain crosslinkable groups and are crosslinked with one another using crosslinkers.

Thermally crosslinkable or thermosetting binder systems crosslink when the applied coat is heated to temperatures above room temperature. Coating systems of this kind are also referred to by the skilled worker as "baking varnishes". They contain crosslinkable groups which at room temperature do not react, or at least not at any substantial rate, but instead react only at relatively high temperatures. Crosslinkable binder systems particularly suitable for the performance of the process of the invention are those which crosslink only at temperatures above 60° C., preferably 80° C., more preferably 100° C., and very preferably 120° C. With advantage it is possible to use those binder systems which crosslink at 100 to 250° C., preferably 120 to 220° C., and more preferably at 150 to 200° C.

The thermally and/or photochemically crosslinkable binder systems (A') may be the binder systems that are typical in the field of coil coating materials. The coats applied using coil coating materials are required to exhibit sufficient flexibility. Binder systems for coil coating materials therefore preferably contain soft segments. Suitable binders and binder systems are known in principle to the skilled worker. It will be appreciated that mixtures of different polymers can also be employed, provided that the mixing does not produce any unwanted effects. Examples of suitable binders comprise (meth)acrylate (co)polymers, partly hydrolyzed polyvinyl esters, polyesters, alkyd resins, polylactones, polycarbonates, polyethers, epoxy resin-amine adducts, polyureas, polyamides, polyimides or polyurethanes. The skilled worker makes an appropriate selection in accordance with the desired end use of the coated metal. To the skilled worker it is clear that not every kind of binder system suits every kind of metallic surface.

For systems which cure thermally it is possible to perform the invention using, preferably, binder systems based on polyesters (A1'), epoxy resins (A2'), polyurethanes (A3') or acrylates (A4').

Polyesters (A1')

Binders based on polyesters can be synthesized, in a way which is known in principle, from low molecular mass dicarboxylic acids and dialcohols and also, if appropriate, further monomers. Further monomers comprise, in particular, monomers having a branching action, examples being tricarboxylic acids or trialcohols. For coil coating it is common to use polyesters having a comparatively low molecular weight, preferably those with an $M_n$ of 500 to 10 000 g/mol, preferably 1000 to 5000 g/mol, and more preferably 2000 to 4000 g/mol.

The hardness and flexibility of the coats based on polyesters can be influenced in a way which is known in principle, through the selection of "hard" or "soft" monomers. Examples of "hard" dicarboxylic acids comprise aromatic dicarboxylic acids and/or their hydrogenated derivatives such as, for example, isophthalic acid, terephthalic acid, phthalic acid, hexahydrophthalic acid and derivatives thereof, especially their anhydrides or esters. Examples of "soft" dicarboxylic acids comprise in particular aliphatic 1,ω-dicarboxylic acids having at least 4 C atoms, such as adipic acid, azelaic acid, sebacic acid or dodecanedioic acid. Examples of "hard" dialcohols comprise ethylene glycol, 1,2-propanediol, neopentyl glycol or 1,4-cyclohexanedimethanol. Examples of "soft" dialcohols comprise diethylene glycol, triethylene glycol, aliphatic 1,ω-dialcohols having at least 4 C atoms, such as 1,4-butanediol, 1,6-hexanediol, 1,8-octanediols or 1,12-dodecanediol. Preferred polyesters for performing the present invention comprise at least one "soft" monomer.

Polyesters for coatings are available commercially. Details of polyesters are given for example in "*Paints and Coatings—Saturated Polyester Coatings*" in Ullmann's Encyclopedia of Industrial Chemistry, 6th ed., 2000, Electronic Release.

Epoxy Resins (A2')

Binder systems based on epoxides can be used for formulations on an organic or else an aqueous basis. Epoxy-functional polymers can be prepared, in a way which is known in principle, through the reaction of epoxy-functional monomers such as bisphenol A diglycidyl ether, bisphenol F diglycidyl ether or hexanediol diglycidyl ether with alcohols such as bisphenol A or bisphenol F, for example. Particularly suitable soft segments are polyoxyethylene and/or polyoxypropylene segments. These may be incorporated advantageously through the use of ethoxylated and/or propoxylated bisphenol A. The binders ought preferably to be chloride-free. Epoxy-functional polymers are available commercially, under the name Epon® or Epikote®, for example.

The epoxy-functional binders may additionally be further functionalized. Epoxy resin-amine adducts, for example, can be obtained by reacting the said epoxy-functional polymers with amines, especially secondary amines such as diethanolamine or N-methylbutanolamine, for example.

Details of epoxy-functional polymers are given for example in "*Epoxy Resins*" in Ullmann's Encyclopedia of Industrial Chemistry, 6th. ed., 2000, Electronic Release Polyacrylates (A3')

Polyacrylate-based binders are particularly suitable for water-based formulations. Examples of suitable acrylates comprise emulsion polymers or copolymers, especially anionically stabilized acrylate dispersions, obtainable in conventional manner from acrylic acid and/or acrylic acid derivatives, examples being acrylic esters such as methyl (meth)acrylate, ethyl (meth)acrylate, butyl (meth)acrylate or 2-ethylhexyl (meth)acrylate and/or vinylaromatic monomers such as styrene, and also, if appropriate, crosslinking monomers. The hardness of the binders may be adjusted by the skilled worker, in a way which is known in principle, through the proportion of "hard" monomers such as styrene or methyl methacrylate and "soft" monomers such as butyl acrylate or 2-ethylhexyl acrylate. Employed with particular preference for the preparation of acrylate dispersions are, furthermore, monomers which have functional groups that are able to react with crosslinkers. These may in particular be OH groups. OH groups can be incorporated into the polyacrylates through the use of monomers such as hydroxyethyl acrylate, hydroxypropyl acrylate, hydroxybutyl acrylate or N-methylolacrylamide, or else of epoxy acrylates followed by hydrolysis. Suitable polyacrylate dispersions are available commercially.

Polyurethane (A4')

Binders based on polyurethane dispersions are particularly suitable for water-based formulations. Dispersions of polyurethanes can be obtained in a way which is known in principle by stabilizing the dispersion by incorporating ionic and/or hydrophilic segments into the PU chain. As soft segments it is possible to use preferably 20 to 100 mol %, based on the amount of all diols, of relatively high molecular mass diols, preferably polyester diols, having an $M_n$ of approximately 500 to 5000 g/mol, preferably 1000 to 3000 g/mol. With particular advantage it is possible to use, to perform the present invention, polyurethane dispersions which comprise bis(4-isocyanatocyclohexyl)methane as isocyanate component. Polyurethane dispersions of that kind are disclosed for example in DE-A 199 14 896. Suitable polyurethane dispersions are available commercially.

Suitable crosslinkers for the thermal crosslinking are known in principle to the skilled worker.

Suitable examples include epoxide-based crosslinkers in which two or more epoxy groups are joined to one another by means of a linking group. Examples comprise low molecular mass compounds having two epoxy groups such as hexanediol diglycidyl ether, phthalic acid diglycidyl ether or cycloaliphatic compounds such as 3,4-epoxycyclohexylmethyl 3',4'-epoxycyclohexanecarboxylate.

Additionally suitable as crosslinkers are high-reactivity melamine derivatives, such as, for example, hexamethyloimelamine or corresponding etherified products such as hexamethoxymethylmelamine, hexabutoxymethylmelamine or else optionally modified amino resins. Crosslinkers of this kind are available commercially, as Luwipal® (BASF AG), for example.

Particular preference is given to using blocked polyisocyanates as crosslinkers to perform the invention. On blocking, the isocyanate group is reacted reversibly with a blocking agent. On heating to higher temperatures, the blocking agent is eliminated again. Examples of suitable blocking agents are disclosed in DE-A 199 14 896, column 12 line 13 to column 13 line 2. Particular preference is given to using polyisocyanates blocked with ε-caprolactam.

Crosslinking of the Binder System

In order to accelerate the crosslinking it is possible, in a way which is known in principle, to add suitable catalysts to the preparations.

The skilled worker makes an appropriate selection from among the crosslinkers in accordance with the binder employed and the outcome desired. It will be appreciated that mixtures of different crosslinkers can also be used, subject to the proviso that this does not adversely affect the properties of the coat. The amount of crosslinker can advantageously be 10% to 35% by weight in relation to the total amount of the binder.

The epoxy-functional polymers can be crosslinked using, for example, crosslinkers based on polyamines, such as diethylenetriamine, for example, amine adducts or polyamino amides. Advantage is possessed for example by crosslinkers based on carboxylic anhydrides or by the crosslinkers already mentioned that are based on melamine. Particular preference is also given to the blocked polyisocyanates already mentioned.

For the thermal crosslinking of the acrylate dispersions, for example, it is possible to employ the aforementioned crosslinkers based on melamine or blocked isocyanates. Epoxy-functional crosslinkers as well are suitable, furthermore.

For the thermal crosslinking of polyurethane dispersions or polyesters it is possible to make use for example of the aforementioned crosslinkers based on melamine, blocked isocyanates or epoxy-functional crosslinkers.

In the case of photochemically crosslinkable preparations the binder systems (A') comprise photochemically crosslinkable groups. The term "photochemical crosslinking" is intended to comprise crosslinking with all kinds of high-energy radiation, such as UV, VIS, NIR or electronic radiation (electron beams), for example. The groups in question may in principle be all kinds of photochemically crosslinkable groups, preference here being given, however, to ethylenically unsaturated groups.

Photochemically crosslinkable binder systems generally comprise oligomeric or polymeric compounds containing photochemically crosslinkable groups, and also, if appropriate, in addition, reactive diluents, generally monomers. Reactive diluents have a viscosity lower than that of the oligomeric or polymeric crosslinkers, and therefore adopt the part of a diluent in a radiation-curable system. For photochemical crosslinking such binder systems further comprise in general one or more photoinitiators.

Examples of photochemically crosslinkable binder systems comprise, for example, polyfunctional (meth)acrylates, urethane (meth)acrylates, polyester (meth)acrylates, epoxy (meth)acrylates, carbonate (meth)acrylates, polyether (meth) acrylates, in combination if appropriate with reactive diluents such as methyl (meth)acrylate, butanediol diacrylate, hexanediol diacrylate or trimethylolpropane triacrylate. More precise details on suitable radiation-curable binders are given in WO 2005/080484 page 3 line 10 to page 16 line 35. Suitable photoinitiators are found in the said specification at page 18 line 8 to page 19 line 10.

For the performance of the present invention it will be appreciated that it is also possible to use binder systems which can be cured by a combination of thermal and photochemical means (these systems also being known as dual-cure systems).

The preparation used in accordance with the invention to apply integrated pretreatment layers comprises 20% to 70% by weight of the binder system (A), preferably (A'). The quantity figures are based on the sum of all components of the preparation bar the solvent or solvent mixture. The quantity is preferably 30% to 60% by weight and more preferably 40% to 50% by weight.

Fillers and/or Pigments (B')

The preparation used for the method of the invention of applying integrated pretreatment layers further comprises at least one finely divided inorganic filler and/or pigment (B'). The filler may also comprise an additional organic coating, for hydrophobicizing or hydrophilicizing, for example. The filler has an average particle size of less than 10 μm. The average particle size is preferably 10 nm to 9 μm and more preferably 100 nm to m. In the case of round or approximately round particles this figure refers to the diameter; in the case of particles of irregular shape, such as needle-shaped particles, for example, it refers to the longest axis. By particle size is meant the primary particle size. The skilled worker is aware of course that finely divided solids frequently undergo agglomeration into larger particles, which for use must be dispersed intensively in the formulation. The particle size is chosen by the skilled worker in accordance with the desired properties of the layer. It is also guided, for example, by the desired layer thickness. As a general rule, the skilled worker will choose smaller particles for a low layer thickness.

Suitable fillers include, on the one hand, electrically conductive pigments and fillers. Additives of this kind serve to improve the weldability and to improve subsequent coating with electrodeposition coating materials. Examples of suitable electrically conducting fillers and pigments comprise phosphides, vanadium carbide, titanium nitride, molybdenum sulfide, graphite, carbon black or doped barium sulfate. Preference is given to using metal phosphides of Zn, Al, Si, Mn, Cr, Fe or Ni, especially iron phosphides. Examples of preferred metal phosphides comprise CrP, MnP, $Fe_3P$, $Fe_2P$, $Ni_2P$, $NiP_2$ or $NiP_3$.

It is also possible to use nonconducting pigments or fillers, such as finely divided amorphous silicas, aluminas or titanium oxides, for example, which may also have been doped with further elements. As an example it is possible to use amorphous silica modified with calcium ions.

Further examples of pigments comprise anticorrosion pigments such as zinc phosphate, zinc metaborate or barium metaborate monohydrate.

It will be appreciated that mixtures of different pigments and/or fillers can also be used. The pigments are employed in a quantity of 20% to 70% by weight. The precise quantity is determined by the skilled worker in accordance with the desired properties of the layer. When using conductivity pigments the quantities employed are typically greater than when using nonconducting fillers. Preferred quantities in the case of conductive pigments and fillers are 40% to 70% by weight; preferred quantities in the case of non-conductive pigments are 20% to 50% by weight.

Copolymer (C)

To produce the integrated pretreatment layers it is possible to use a single copolymer (C) or else two or more different copolymers (C). From among those copolymers (C) which are possible in principle the skilled worker will make a specific selection in accordance with the desired properties of the integrated pretreatment layer. For the skilled worker it is obvious that not all kinds of copolymers (C) are equally suitable for all kinds of binder systems, solvent or metallic surfaces. Preference for the application of integrated pretreatment layers is given in particular to copolymers (C) containing phosphoric and/or phosphonic acid groups.

The copolymers (C) used in accordance with the invention are typically employed in a quantity of 0.25% to 40% by weight, preferably 0.5% to 30% by weight, more preferably 0.7% to 20% by weight, and very preferably 1.0% to 10% by weight, based on the quantity of all of the components of the formulation bar the solvent.

Solvent (D')

As component (D') the preparation generally comprises a suitable solvent, in which the components are in solution and/or dispersion, in order to allow uniform application of the preparation to the surface. The solvents are generally removed before the coating is cured. It is also possible in principle, however, to formulate a solvent-free or substantially solvent-free preparation. In this case the preparations in question are, for example, powder coating materials or photochemically curable preparations.

Suitable solvents are those capable of dissolving, dispersing, suspending or emulsifying the compounds of the invention. They may be organic solvents or water. As will be appreciated, mixtures of different organic solvents or mixtures of organic solvents with water can also be used. Among the solvents that are possible in principle the skilled worker will make an appropriate selection in accordance with the desired end use and with the nature of the compound of the invention used.

Examples of organic solvents comprise hydrocarbons such as toluene, xylene or mixtures such as are obtained in the refining of crude oil, such as, for example, defined-boiling-range hydrocarbon fractions, ethers such as THF or polyethers such as polyethylene glycol, ether alcohols such as butyl glycol, ether glycol acetates such as butyl glycol acetate, ketones such as acetone, and alcohols such as methanol, ethanol or propanol.

In addition it is also possible to use preparations which comprise water or a predominantly aqueous solvent mixture. By this are meant those mixtures which comprise at least 50% by weight, preferably at least 65% by weight, and more preferably at least 80% by weight of water. Further components are water-miscible solvents. Examples comprise monoalcohols such as methanol, ethanol or propanol, higher alcohols such as ethylene glycol or polyether polyols, and ether alcohols such as butyl glycol or methoxypropanol.

The quantity of the solvents is selected by the skilled worker in accordance with the desired properties of the preparation and with the desired application method. As a general rule the weight ratio of the layer components to the solvent is 10:1 to 1:10, preferably about 2:1, without any intention that the invention should be restricted thereto. It is, of course, also possible first to prepare a concentrate and to dilute it to the desired concentration only when on site.

The preparation is prepared by intensively mixing the components of the preparation with—where used—the solvents. Suitable mixing or dispersing assemblies are known to the skilled worker. The copolymers are used preferably in the form of the solutions or emulsions obtained in the hydrolytic opening of the anhydride groups and/or the derivatization and also, if appropriate, solvent exchange. Solvents in these synthesis stages should be selected so as to be at least compatible with the binder system that is to be used; with particular advantage the solvent used is the same.

Auxiliaries and/or Additives (E')

In addition to components (A'), (B'), (C) and also, optionally, (D'), the preparation may further comprise one or more auxiliaries and/or additives (E'). The purpose of such auxiliaries and/or additives is to fine-tune the properties of the layer. Their quantity generally does not exceed 20% by weight relative to the sum of all of the components bar the solvents, and preferably does not exceed 10%.

Examples of suitable additives are color and/or effect pigments, rheological assistants, UV absorbers, light stabilizers, free-radical scavengers, free-radical addition-polymerization initiators, thermal-crosslinking catalysts, photoinitiators and photo-coinitiators, slip additives, polymerization inhibitors, defoamers, emulsifiers, devolatilizers, wetting agents, dispersants, adhesion promoters, flow control agents, film-forming auxiliaries, rheology control additives (thickeners), flame retardants, siccatives, anti-skinning agents, other corrosion inhibitors, waxes, and matting agents, as are known from the textbook "Lackadditive" [Additives for coatings] by Johan Bieleman, Wiley-VCH, Weinheim, N.Y., 1998, or from German patent application DE 199 14 896 A1, column 13 line 56 to column 15 line 54.

Applying Integrated Pretreatment Layers

To implement the preferred method for applying integrated pretreatment layers the preparation is applied to the metallic surface.

As an option the metallic surface can be cleaned prior to treatment. Where the treatment of the invention takes place immediately after a metallic surface treatment, such as an electrolytic galvanization or a hot dip galvanization of steel coils, then the coils may generally be contacted with the treatment solution of the invention, without prior cleaning. Where, however, the metal coils for treatment have been stored and/or trans-ported prior to coating in accordance with the invention, they generally carry or are soiled with corrosion control oils, so necessitating cleaning prior to coating in accordance with the invention. Cleaning can take place by methods known to the skilled worker, using customary cleaning agents.

The preparation can be applied by, for example, spraying, dipping, pouring or roller application. After a dipping operation the workpiece can be left to drip-dry, in order to remove excess preparation; in the case of metal sheets, foils or the like it is also possible to remove excess preparation by squeezing off or squeegeeing. Application with the preparation takes place generally at room temperature, although this is not intended to rule out the possibility in principle of higher temperatures.

The method of the invention is preferably used to coat metal coils. In this coil coating operation, coating may be performed either on one side or on both sides. It is also possible to coat the top and bottom faces using different formulations.

With very particular preference, coil coating takes place by means of a continuous process. Continuous coil coating lines are known in principle. They generally comprise at least one coating station, a drying or baking station and/or UV station, and, if appropriate, further stations for pretreatment or aftertreatment, such as rinsing or afterrinsing stations, for example. Examples of coil coating lines are found in Römpp Lexikon Lacke und Druckfarben, Georg Thieme Verlag, Stuttgart, N.Y., 1998, page 55, "Coil coating", or in German patent application DE 196 32 426 A1. It will be appreciated that lines with a different construction can also be employed.

The speed of the metal coil is selected by the skilled worker in accordance with the application and curing properties of the preparation employed. Speeds which have been found appropriate are generally from 10 to 200 m/min, preferably 12 to 120 m/min, more preferably 14 to 100 m/min, very preferably 16 to 80, and in particular 20 to 70 m/min.

For application to the metal coil the crosslinkable preparation employed in accordance with the invention can be applied by spraying, pouring or, preferably, by roller application. In the case of the preferred roll coating, the rotating pick-up roll dips into a reservoir of the inventively employed preparation and so picks up the preparation to be applied. This material is transferred from the pick-up roll to the rotating application roll directly or via at least one transfer roll. The coating material is stripped from this application roll and so transferred to the coil as it runs in the same or opposite direction. In accordance with the invention the opposite-direction stripping, or reverse roller-coating method, is of advantage and is therefore employed with preference. The circumferential speed of the application roll is preferably 110% to 125% of the coil speed, and the peripheral speed of the pick-up roll is 20% to 40% of the coil speed. The inventively employed preparation can alternatively be pumped directly into a gap between two rolls, this being referred to by those in the art as nip feed.

Following the application of the inventively employed preparation, any solvent present in the layer is removed and the layer is crosslinked. This can take place in two separate steps or else simultaneously. To remove the solvent, the layer is preferably heated by means of an appropriate apparatus. Drying can also take place by contacting with a stream of gas. The two methods can be combined.

The method of curing is guided by the nature of the binder system employed. It may take place thermally and/or photochemically.

In the case of thermal crosslinking, the applied coating is heated. This can be accomplished preferably by convection heat transfer, irradiation with near or far infrared, and/or, in the case of iron-based coils, by electrical induction.

The temperature required for curing is guided in particular by the crosslinkable binder system employed. Highly reactive binder systems may be cured at lower temperatures than less reactive binder systems. As a general rule the crosslinking is performed at temperatures of at least 60° C., preferably at least 80° C., more preferably at least 100° C., and very preferably at least 120° C. In particular the crosslinking can be performed at 100 to 250° C., preferably 120 to 220° C., and more preferably at 150 to 200° C. The temperature referred to in each case is the peak metal temperature (PMT), which can be measured by methods familiar to the skilled worker (for example, contactless infrared measurement or temperature determination with adhered test strips).

The heating time, i.e., the duration of the thermal cure, varies depending on the coating material employed in accordance with the invention. The time is preferably 10 s to 2 min. Where essentially convection heat transfer is employed, the need is for forced-air ovens with a length of 30 to 50 m, in particular 35 to 45 m, at the preferred coil speeds. The forced-air temperature is of course higher than the temperature of the coat and can amount to up to 350° C.

Photochemical curing takes place by means of actinic radiation. By actinic radiation is meant, here and below, electromagnetic radiation, such as near infrared, visible light, UV radiation or x-rays, or particulate radiation, such as electron beams. For photochemical curing it is preferred to employ UV/VIS radiation. Irradiation may also be carried out, if appropriate, in the absence of oxygen, such as under an inertgas atmosphere. The photochemical cure may take place under standard temperature conditions, i.e., without the coating being heated, or alternatively photochemical crosslinking can take place at elevated temperatures of, for example, 40 to 150° C., preferably 40 to 130° C., and in particular at 40 to 100° C.

As a result of the method of the invention it is possible to obtain an integrated pretreatment layer on a metallic surface, particularly the surface of iron, steel, zinc, zinc alloys, aluminum or aluminum alloys. The precise structure and composition of the integrated pretreatment layer is not known to us. Besides the crosslinked binder system (A) it comprises the fillers, the copolymers (C), and, optionally, further components. In addition there may also be components present that have been extracted from the metal surface and deposited again, such as typical amorphous oxides of aluminum or of zinc and also, if appropriate, of further metals.

The thickness of the integrated pretreatment layer is 1 to 25 µm and is set by the skilled worker in accordance with the desired properties and the end use of the layer. In general a thickness of 3 to 15 µm has been found appropriate for integrated pretreatment layers. A thickness of 4 to 10 µm is preferred, while 5 to 8 µm are particularly preferred. The thickness depends on the quantity of composition applied in each case.

In case of applications in the automobile segment the application of the integrated pretreatment layer of the invention may under certain circumstances not in fact be followed by cathodic dip coating. If the integrated pretreatment layer is also intended to replace the cathodic electrocoat, somewhat thicker integrated pretreatment layers are advisable, with a thickness for example of 10 to 25 µm, preferably 12 to 25 µm.

Atop the metallic surface provided with an integrated pretreatment layer it is also possible for further coating films to be applied. The nature and number of the coating films required are determined by the skilled worker in accordance with the desired use of the coated metal or shaped metallic part. The integrated pretreatment layers of the invention lend themselves well to overcoating and enjoy good adhesion with the subsequent coating films. Further coating films may include, for example, films of color coating, clearcoating or functional coating materials. One example of a functional coating material is a soft coating material having a relatively high filler content. This coating material can be applied advantageously before the color coating and/or topcoating material, in order to protect the metal and the integrated pretreatment layer against mechanical damage, caused by stonechipping or scratching, for example.

The application of further coating films may be implemented on the coil coating line described. In that case two or more application stations and also, optionally, curing stations are placed in series. Alternatively, after the corrosion control coat has been applied and cured, the coated coil can be rolled up again and further coats can be applied only at a later point in time, on other lines. The further-processing of the coated metal coils may take place on site, or they may be transported to a different site for further-processing. For this purpose they may be provided with, for example, removable protective sheets.

Coils which have been provided with an integrated pretreatment layer can alternatively first be processed—by means of cuffing, shaping, and joining, for example—to form shaped metallic parts. The joining may also be accomplished by means of welding. After that the shaped article obtained can be provided as described above with further coating films.

The invention hence also provides shaped articles having a metallic surface coated with an integrated pretreatment layer having a thickness of 1 to 25 µm, and shaped articles additionally possessing further coating films. The term "shaped article" is intended here to comprise coated metal panels, foils or coils, and also the metallic components obtained from them.

Such components are in particular those that can be used for paneling, facing or lining. Examples comprise automobile bodies or parts thereof, truck bodies, frames for two-wheelers such as motorcycles or pedal cycles, or parts for such vehicles, such as fairings or panels, casings for household appliances such as washing machines, dishwashers, laundry dryers, gas and electric ovens, microwave ovens, freezers or refrigerators, paneling for technical instruments or installations such as, for example, machines, switching cabinets, computer housings or the like, structural elements in the architectural segment, such as wall parts, facing elements, ceiling elements, window profiles, door profiles or partitions, furniture made from metallic materials, such as metal cupboards, metal shelves, parts of furniture, or else fittings. The components may additionally be hollow articles for storage of liquids or other substances, such as, for example, tins, cans or tanks.

Atmospheric Corrosion Control

In a second preferred embodiment of the invention the method of applying corrosion control coats is a method of atmospheric corrosion control.

The metallic surfaces able to be protected by means of the method of atmospheric corrosion control may in principle be any desired surfaces. With preference, however, they are the surfaces of metallic structures or metal constructions and/or their required components. Metal constructions and structures are typically connected from construction-grade steel, such as steel girders, steel pipes or steel panels, by riveting, welding or screwing, to form corresponding constructions. The surfaces in the course of their use may be in contact with atmospheric air, although the surfaces involved may also be those which in the course of use are in contact with water, soil or other corrosive media. Examples comprise bridges, power masts, tanks, containers, chemical plant, buildings, roofs, pipes, couplings, flanges, ships, cranes, posts or bulkheads.

The surfaces in question are in particular those of iron, steel, zinc, zinc alloys, aluminum or aluminum alloys. Steel may comprise the typical alloying components known to the skilled worker. Examples have already been given above.

Examples of suitable alloying constituents for Zn alloys or aluminum alloys have already been given above. Zn coatings or aluminum coatings can be applied to steel by means, for example, of hot dip methods, such as hot dip galvanizing, or by Sherardizing. Where the component is fixed or its geometry does not allow it, corresponding coats can also be applied by means of thermal spraying (spray galvanizing, spray aluminizing).

In atmospheric corrosion control, corrosion control coatings are typically applied on site by brushing or spraying. Corrosion control coatings of this kind are generally dried and cured under atmospheric conditions, in other words, for instance, at ambient temperature and in the presence of air or atmospheric oxygen and usual atmospheric humidity. Depending on the degree of control required, the control of corrosion on surfaces by means of corrosion control coatings is also termed light, medium or heavy duty corrosion control.

With particular preference the method of atmospheric corrosion control can be used for metallic surfaces which are subject to corrosion exposure of categories C2 (in accordance with DIN EN ISO 12944) or higher, preferably categories C3 or higher, and more preferably categories C4 or higher.

The corrosiveness categories in accordance with DIN EN ISO 12944 are defined by the mass loss per unit area or thickness reduction of unalloyed steel or for zinc whose surfaces have been subjected for 12 months to a defined corrosive exposure.

| | | |
|---|---|---|
| C2 (low corrosivity): | unalloyed steel: | mass loss > 10-200 g/m$^2$ |
| | | thickness decrease > 1.3-25 μm |
| | zinc: | mass loss > 0.7-5 g/m$^2$ |
| | | thickness decrease > 0.1-0.7 μm |
| C3 (medium corrosivity): | unalloyed steel: | mass loss > 200-400 g/m$^2$ |
| | | thickness decrease > 25-50 μm |
| | zinc: | mass loss > 5-15 g/m$^2$ |
| | | thickness decrease > 0.7-2.1 μm |
| C4 (high corrosivity): | unalloyed steel: | mass loss > 400-650 g/m$^2$ |
| | | thickness decrease > 50-80 μm |
| | zinc: | mass loss > 15-30 g/m$^2$ |
| | | thickness decrease > 2.1-4.2 μm |
| C5-I/M (very high): | unalloyed steel: | mass loss > 650-1500 g/m$^2$ |
| | | thickness decrease > 80-200 μm |
| | zinc: | mass loss > 30-60 g/m$^2$ |
| | | thickness decrease > 4.2-8.4 μm |

The present method is preferably a chromium(VI)-free method, more preferably a chromium-free method. The term "chromium(VI)-free" or "chromium-free" in the context of this invention means that the preparation employed does not itself comprise any chromium(VI) compounds or, respectively, any chromium compounds at all, and that, in addition, no corrosion-inhibiting pretreatment of the metal surface with chromium(VI) compounds or chromium compounds, respectively, is carried out either. It will be appreciated that this does not rule out the possibility of traces of chromium being located unintentionally per se—in the coat. These may, for example, be chromium traces leached from the steel during the coating of a steel containing chromium.

The method of the invention of atmospheric corrosion control is performed in accordance with the invention using a preparation which comprises at least one binder system (A") curable under atmospheric conditions, at least one component (B") selected from the group of finely divided fillers, pigments or dyes, at least one copolymer (C), and at least one solvent (D").

Binder System (A")

The binder systems (A") curable under atmospheric conditions may be the binder systems typical in the field of corrosion control coatings and other coatings. Binders or binder systems of this kind are known in principle to the skilled worker. It will be appreciated that mixtures of different binder systems can also be employed, provided that mixing does not give rise to any unwanted effects.

The term "binder system" refers below, in a way which is known in principle, to those components of the formulation that are responsible for the formation of a film.

The term "curable under atmospheric conditions" means that the binder systems have the capacity, following application to the surface under typical ambient conditions, i.e., approximately at room temperature, in the presence of air and also typical atmospheric humidity, to cure without the use of additional apparatus or equipment. Typical curing temperatures, depending on the environment, are more than 0 to 40° C., preferably 5 to 35° C., and, for example, 15 to 25° C. It is clear to the skilled worker that the time to complete curing of one and the same binder system may differ according to the ambient conditions actually prevailing.

Curing may proceed by a variety of mechanisms, depending on the nature of the binder system employed. By way of example the curing involved may be purely physical curing, produced by the evaporation of the solvent used. It may also be an oxidative curing through reaction of the binder system with the oxygen in the air. Finally, it may also be a chemical crosslinking (reactive crosslinking). Reactive binder systems comprise crosslinkable components. The crosslinkable components may be of low molecular mass, oligomeric or polymeric. The systems in question may be preferably one-component (1 K) or else two-component (2 K) systems. Reactively crosslinking systems also comprise moisture-curing binder systems, where the atmospheric moisture functions as a curing component. It will be appreciated that a binder system may also cure through a combination of different curing methods. In the case of 2 K systems the binder component and curing component are mixed, in a way which is known in principle, before the formulation is used.

The invention can be performed using aqueously soluble or organically soluble binder systems. Preference is given to binder systems on an aqueous basis.

Binder systems for corrosion control coatings, especially corrosion control systems on an aqueous basis, are known in principle to the skilled worker. They may for example be epoxy resins, polyacrylates, styrene-acrylate polymers, polyesters, alkyd resins, polyurethanes of styrene-butadiene polymers.

The amount of binders (A) in the formulation is 15 to 70% by weight, based on the amount of all of the components of the formulation, including the solvent. It is set by the skilled worker in accordance with the desired properties of the coating. The amount is preferably 20% to 60% by weight and more preferably 25% to 50% by weight.

Preferred binder systems for performing the inventions are described below.

Polyacrylates or Styrene-Acrylate Copolymers (A1")

In one preferred embodiment of the invention the binder system is an aqueous or pre-dominantly aqueous dispersion of polyacrylates or styrene-acrylate copolymers (A1").

Aqueous dispersions of polyacrylates or styrene-acrylate copolymers (A1") for preparing corrosion control coatings are known in principle to the skilled worker. The aqueous dispersions of the polyacrylates (A1) may be either primary dispersions or secondary dispersions. Suitable polyacrylates comprise as principal monomers at least one alkyl (meth) acrylate such as, for example, methyl (meth)acrylate, ethyl (meth)acrylate, butyl (meth)acrylate or 2-ethylhexyl (meth) acrylate. They can have preferably as further principal monomers vinylaromatics, especially styrene. The amount of the principal monomers together is in general at least 60% by weight, preferably at least 80% by weight. Styrene-acrylate copolymers comprise in addition to the stated alkyl (meth) acrylates as principal monomer in general at least 30% by weight, preferably at least 40% by weight, and more preferably about 50% by weight of styrene. The polyacrylates or styrene-acrylate copolymers (A1") may additionally have further comonomers as well, particularly those containing functional groups such as hydroxyl, carboxyl or carboxamide groups. Examples comprise (meth)acrylic acid, itaconic acid, maleic acid, fumaric acid, (meth)acrylamide or hydroxyalkyl (meth)acrylates. Further comonomers are preferably acidic comonomers. In addition it is also possible, optionally, for crosslinking monomers to be present as well in small amounts, typically less than 4% by weight, preferably less than 2% by weight. Examples comprise butanediol (meth) acrylate, hexanediol di(meth)acrylate or allyl acrylate.

Polyacrylates (A1") can be prepared in a way which is known in principle by means of emulsion polymerization. Further details of such polymers and of their preparation are disclosed for example in EP-A 157 133, WO 99/46337, or in "Paints and Coatings, 2.5. Acrylic Coatings" in Ullmann's Encyclopedia of Technical Chemistry, 6th Edition 2000, Electronic Release. The skilled worker makes an appropriate selection from the polyacrylates (A1) possible in principle, in accordance with the desired properties of the coat.

Especially suitable for performing the invention are styrene-acrylate copolymers which comprise as principal monomers at least one elastomeric acrylate such as, for example, n-butyl (meth)acrylate, n-hexyl (meth)acrylate, n-octyl acrylate or 2-ethylhexyl (meth)acrylate in a mixture with styrene and also, as secondary monomer, at least one acidic monomer, such as (meth)acrylic acid, for example. For use as binders for the formulation it is possible for some or all of the acid groups to be neutralized with suitable bases, such as, for example, ammonia.

The polyacrylates employed ought in general to have a glass transition temperature, $T_g$, in the range from 0 to 60° C., preferably in the range from 5 to 40° C. (measured by the DSC method in accordance with DIN EN ISO 11357). The glass transition temperature may be chosen by the skilled worker, in a way which is known in principle, through the selection and the proportion of hard monomers and soft monomers.

With preference for performing the invention it is possible additionally to use polyacrylates (A1) having an average particle size of 50 nm to 400 nm, more preferably 80 nm to 250 nm (measured with the Malvern® Autosizer 2 C).

Suitable acrylate dispersions and styrene-acrylate dispersions for preparing corrosion control coatings are available commercially, as for example Acronal® S 760 or Acronal® LR 8977 (BASF Aktiengesellschaft) or Acronal® Optive 410 (BASF Corporation).

Styrene-Alkadiene Polymers (A2")

In a second, preferred embodiment of the invention the binder system is an aqueous or predominantly aqueous dispersion of styrene-alkadiene polymers (A2").

Aqueous dispersions of styrene-alkadiene polymers (A2") for preparing corrosion control coatings are known in principle to the skilled worker and described for example in EP-A 47380. They may preferably be primary dispersions or else secondary dispersions.

Suitable polymers (A2") comprise as principal monomers styrene and also at least one conjugated aliphatic diene (alkadiene). The alkadienes may be, for example, butadiene, isoprene, 1,3-pentadiene or dimethylbutadiene. The styrene may also be substituted by alkyl groups. Examples comprise α-methylstyrene or 4-methylstyrene. The principal monomers are preferably styrene and butadiene. In general the polymers comprise at least 20% by weight styrene and 20% by weight alkadienes, the amount of the principal monomers together being in general at least 60% by weight, preferably at least 80% by weight. The quantities are based in each case on the sum of all of the monomers. They may additionally have further comonomers as well. Here mention may be made, on the one hand, of ethylenically unsaturated carboxylic and/or dicarboxylic acids such as (meth)acrylic acid, maleic acid or itaconic acid. Additionally the comonomers may be ethylenically unsaturated carbonitriles such as (meth)acrylonitrile and also alkyl (meth)acrylates such as methyl (meth)acrylate, n-butyl (meth)acrylate, n-hexyl (meth)acrylate, n-octyl acrylate or 2-ethylhexyl (meth)acrylate.

Styrene-alkadiene polymers (A2") can be prepared in a way which is known in principle by means of emulsion polymerization. Further details of styrene-butadiene polymers for coating materials and also of their preparation are disclosed for example in "Paints and Coatings, 2.4. Polystyrene and Styrene Copolymers" in Ullmann's Encyclopedia of Technical Chemistry, 6th Edition 2000, Electronic Release.

Particularly suitable for performing the invention are styrene-butadiene polymers which comprise as a secondary monomer one or more acidic monomers, such as, for example, (meth)acrylic acid, preferably in an amount of 0.5% to 5% by weight. For use as binders for the formulation it is possible with preference for some or all of the acid groups to be neutralized with suitable bases, such as ammonia.

The styrene-butadiene polymers (A2") employed ought in general to have a glass transition temperature $T_g$ in the range from 0 to 60° C., preferably in the range from 5 to 40° C. The glass transition temperature can be chosen by the skilled worker in a way which is known in principle through the selection and the proportion of hard monomers and soft monomers.

Preferably for performing the invention it is possible in addition to use styrene-butadiene polymers (A2") having an average particle size of 50 nm to 400 nm, more preferably 80 nm to 250 nm (measured as above).

Polyurethanes (A3")

In a third, preferred embodiment of the invention the binder system is an aqueous or predominantly aqueous dispersion of polyurethanes (A3").

Aqueous dispersions of polyurethanes (A3") for preparing corrosion control coatings are known in principle to the skilled worker. Details of polyurethanes for coating materials and also of their preparation are disclosed for example in "Paints and Coatings, 2.9 Polyurethane Coatings" in Ullmann's Encyclopedia of Technical Chemistry, 6th Edition 2000, Electronic Release. The aqueous dispersions of the polyurethanes (A3") may be either primary dispersions or secondary dispersions.

Polyurethanes for aqueous dispersions can be synthesized, in a way which is known in principle, from customary diisocyanates and also diols. With a view to effective film formation and good elasticity, diols particularly suitable for this purpose are those having a number-average molecular weight $M_n$ of about 500 to 5000 g/mol, preferably about 1000 to 3000 g/mol. For this purpose it is possible to use both polyether diols and polyester diols. The amount of such diols of relatively high molecular weight is typically 10 to 100 mol % relative to the sum of all the diols. The desired hardness and elasticity of the film can be controlled by using, in addition to the diol already mentioned, low molecular weight diols having a number-average molecular weight $M_n$ of about 60 to 500 g/mol.

For the synthesis of polyurethanes for aqueous dispersions use is made, furthermore of monomers which comprise at least one isocyanate group or one group which is reactive toward isocyanate groups, and also, additionally, at least one hydrophilic group. These may be nonionic groups such as polyoxyethylene groups, acidic groups such as COOH, sulfonate or phosphonate groups, or basic groups such as amino groups, for example. With preference they are acidic groups. For use as binders for the formulation it is possible with preference for all or some of the acid groups to be neutralized with suitable bases. Preferred for this purpose are ammonia or amines. Further details on such polyurethane dispersions and also their preparation are described at length in WO 2005/005565, page 4 line 13 to page 14 line 14. Further examples of suitable polyurethanes are disclosed in U.S. Pat. No. 5,707, 941 or in WO 2004/101638, especially page 2 line 31 to page 14 line 11.

The polyurethanes may also have been modified. By way of example, the compounds in question may be oxidatively curing urethane alkyds. For the preparation it is possible to subject, for example, triglycerides of unsaturated fatty acids to partial hydrolysis. The resultant OH group is able to react with the isocyanate groups in the course of polyurethane preparation.

With preference for performing the invention it is possible additionally to use polyurethanes (A3") having an average particle size of not more than 1000 nm, preferably less than 500, more preferably less than 200 nm, and in particular 20 to 200 nm.

Alkyd Resins (A4")

In a fourth, preferred embodiment of the invention the binder system is an aqueous or predominantly aqueous dispersion of alkyd resins (A4").

Aqueous dispersions of alkyd resins (A4") for preparing corrosion control coatings are known in principle to the skilled worker. Alkyd resins (A4") are oxidatively curing polycondensation resins of polyols and polybasic carboxylic acids, in which at least one OH group of the polyol is esterified with fatty oils and/or with natural and/or synthetic mono- or polyunsaturated fatty acids, it being necessary for at least one of the polyols employed to have a functionality of three or more.

Examples of preferred polyhydric alcohols comprise glycerol, pentaerythritol, trimethyllolethane, trimethylolpropane, various diols such as ethanediol/propanediol, diethylene glycol and neopentyl glycol.

Preferred polybasic carboxylic acids are phthalic acid (anhydride) (PAn), isophthalic acid, terephthalic acid, trimellitic anhydride, adipic acid, azelaic acid, sebacic acid; phthalic acid (anhydride) is particularly preferred.

Examples of suitable oil components or fatty acids include drying oils, such as linseed oil, oiticica oil or tung oil, semi-drying oils, such as soybean oil, sunflower oil, safflower oil, ricinine oil or tall oil, nondrying oils, such as castor oil, coconut oil or peanut oil, or free fatty acids of above oils.

The molar mass $M_n$ of typical alkyd resins is between 1500 and 20 000 g/mol, preferably between 3500 and 6000 g/mol. The acid number is preferably 2 to 30 mg KOH/g, or else 35-65 mg KOH/g in the case of water-dilutable resins. The OH number is generally up to 300, preferably up to 100 mg KOH/g.

The term "alkyd resins" is also intended to comprise modified alkyd resins such as styrene-modified alkyd resins, urethane alkyds, urethane oils or epoxy resin-modified alkyd resins. Modified alkyd resins of this kind are known to the skilled worker.

Further details of alkyd resins (A4") for coating materials and also of their preparation are disclosed for example in "*Paints and Coatings, 2.6. Alkyd Coatings*" in Ullmann's Encyclopedia of Technical Chemistry, 6th Edition 2000, Electronic Release, and also in "*Lackformulierung und Lackrezeptur*" [Paint Formulation and Paint Formula], edited by Ulrich Zorll, p. 188 ff., Curt R. Vinzentz Verlag, Hanover, 2003.

The alkyd resins (A4") employed ought in general to have a glass transition temperature $T_g$ in the range from 0 to 60° C., preferably from 5 to 40° C.

Filler/Pigment/Dye (B")

The inventively used preparation further comprises at least one component (B") selected from the group of finely divided fillers, pigments or dyes.

The finely divided filler is generally an inorganic filler. Fillers and/or pigments may of course comprise an additional organic coating, for the purpose of hydrophobicization or hydrophilicization, for example.

The filler ought not to exceed an average particle size of 10 µm. With preference the average particle size is 10 nm to 8 µm, with particular preference 100 nm to 5 µm, and, for example, 2 to 4 µm. In the case of round or approximately round particles, this figure refers to the diameter; in the case of particles of irregular shape, such as with needle-shaped particles, for example, it refers to the longest axis. By particle size is meant the primary particle size. The skilled worker is aware of course that finely divided solids frequently undergo agglomeration into larger particles, which for use must be dispersed intensively. The particle size is chosen by the skilled worker in accordance with the desired properties of the coat.

The pigments may in particular be anticorrosion pigments. These may include both active and passive anticorrosion pigments.

Examples of active anticorrosion pigments comprise, in particular, phosphates, phosphate-containing or modified phosphates such as pigments based on zinc phosphate, zinc aluminum orthophosphate, zinc molybdenum orthophosphate, zinc aluminum molybdenum orthophosphate, calcium hydrogen phosphate, zinc calcium strontium orthophosphate silicate, zinc aluminum polyphosphate, strontium aluminum polyphosphate, zinc calcium aluminum strontium orthophosphate polyphosphate silicate and calcium aluminum polyphosphate silicate. Further examples comprise combinations of inorganic phosphates with electrochemically active organic corrosion inhibitors of low solubility, such as zinc phosphate modified with Zn salts or Ca salts of 5-nitroisophthalic acid. In addition it is also possible to use iron phosphide, zinc hydroxyphosphide, borosilicate pigments such as barium metaborate or zinc borophosphates, molybdates such as zinc molybdate, sodium zinc molybdates or calcium molybdate, pigments having ion exchange properties such as amorphous $SiO_2$ modified with calcium ions, or correspondingly modified silicates, metal oxides, such as ZnO, or else metal powders, such as zinc dust. It will be appreciated that typical organic anticorrosion pigments can also be used, such as Zn salts or Ca salts of 5-nitroisophthalic acid, for example.

Passive anticorrosion pigments prolong the diffusion pathways for corrosive components and thereby increase the corrosion resistance. Examples comprise, in particular, platelet-shaped or lamelliform pigments such as mica, hematite, phyllosilicates, linear polysilicates such as wollastonite, talc or metal flakes such as aluminum flakes or iron flakes.

Further details on anticorrosion pigments are disclosed for example in "*Pigments, 4.2 Anticorrosive Pigments*" in Ullmann's Encyclopedia of Technical Chemistry, 6th Edition 2000, Electronic Release.

The pigments may also be typical color pigment and/or effect pigment.

By effect pigments are meant all pigments which exhibit a platelet-shaped construction and impart specific decorative color effects to a surface coating. Effect pigments are known to the skilled worker. Examples comprise straight metal pigments, such as aluminum, iron or copper pigments, interference pigments, such as titanium dioxide-coated mica, iron oxide-coated mica, mixed oxide-coated mica (with titanium dioxide and $Fe_2O_3$, for example), metal oxide-coated aluminum, or liquid-crystal pigments.

Color pigments are, in particular, typical organic or inorganic absorption pigments that can be used in the paint industry. Examples of organic absorption pigments are azo pigments, phthalocyanine pigments, quinacridone pigments, and pyrrolopyrrole pigments. Examples of inorganic absorption pigments are iron oxide pigments, titanium dioxide, and carbon black.

Examples of dyes are azo, azine, anthraquinone, acridine, cyanine, oxazine, polymethine, thiazine and triarylmethane dyes. These dyes may find application as basic or cationic dyes, mordant dyes, direct dyes, disperse dyes, ingrain dyes, vat dyes, metal complex dyes, reactive dyes, acid dyes, sulfur dyes, coupling dyes or substantive dyes.

Fillers can be used to influence the properties of the coating, such as, for example, hardness, rheology or the orientation of the effect pigments. Fillers are frequently coloristically inactive; in other words, their inherent absorption is low and the refractive index is similar to that of the coating medium. Examples of fillers comprise talc, calcium carbonate, kaolin, barium sulfate, magnesium silicate, aluminum silicate, crystalline silicon dioxide, amorphous silica, aluminum oxide, microbeads or hollow microbeads made for example of glass, ceramic or polymers and having sizes of 0.1-10 μm for example. As fillers it is additionally possible to use any desired solid inert organic particles, such as urea-formaldehyde condensation products, micronized polyolefin wax or micronized amide wax. The inert fillers may each also be used in a mixture. Preferably, however, only one filler is employed in each case.

The components (B") are used in an amount of 1% to 70% by weight. The precise amount is set by the skilled worker in accordance with the desired properties of the coat. The amount is preferably 5% to 60% by weight and more preferably 10% to 50% by weight.

When using pigments and/or fillers it has been found appropriate to have pigment volume concentrations (PVCs) of 15% to 40%, preferably 20% to 40%, and more preferably 20% to 35% by volume, without any intention that the invention should be restricted thereto.

The nature and amount of components (B") are determined by the skilled worker in accordance with the end use for the coat. In one particularly preferred embodiment of the invention no chromium-containing components (B") are employed. It will be appreciated that mixtures of different components (B") can also be employed.

Preparations intended for priming are typically more highly pigmented than preparations intended for intermediate coating or top coating.

Preparations intended for priming typically comprise at least one active anticorrosion pigment; those intended for intermediate coatings, at least one passive anticorrosion pigment; and those for top coatings at least one color pigment and/or one dye.

In one particularly preferred embodiment, preparations intended for priming comprise at least one active anticorrosion pigment, at least one filler, and also, preferably, at least one color pigment.

Copolymer (C)

To produce the inventively used preparation for atmospheric corrosion control it is possible to use a single copolymer (C) or else two or more different copolymers (C). From among those copolymers (C) which are possible in principle the skilled worker will make a specific selection in accordance with the desired properties of the corrosion control coat. For the skilled worker it is obvious that not all kinds of copolymers (C) are equally suitable for all kinds of binder systems, solvents or surfaces.

For atmospheric corrosion control it is possible with preference to use copolymers (C) having COOH and/or sulfonic acid groups. Very particular preference is given to copolymers comprising itaconic acid as monomer (C2).

The inventively used copolymers (C) are employed in an amount of 0.1% to 40% by weight, preferably 0.2% to 20% by weight, and more preferably 0.5% to 10% by weight, based in each case on the amount of all of the components of the formulation.

Solvents (D")

As component (D") the preparation for atmospheric corrosion control comprises a suitable solvent. Suitable solvents are those capable of dissolving, dispersing, suspending or emulsifying the inventively used components, in order to allow uniform application of the preparation to the surface. They may be organic solvents or water. As will be appreciated, mixtures of different solvents are also possible.

Examples of organic solvents comprise hydrocarbons such as toluene, xylene and, in particular, mixtures of defined-boiling-range hydrocarbons, as obtained in the refining of crude oil, ethers such as THF or polyethers such as polyethylene glycol, ether alcohols such as butyl glycol, ether glycol acetates such as butyl glycol acetate, ketones such as acetone and alcohols such as methanol, ethanol or propanol.

The solvent is preferably water or a predominantly aqueous solvent mixture. By such are meant mixtures of the kind which comprise at least 75%, preferably at least 85%, more preferably at least 90% and very preferably at least 95% by weight of water.

Further components of predominantly aqueous solvent mixtures may be water-miscible solvents. Examples comprise, in particular, typical cosolvents such as n-butanol, butyl glycol, butyl diglycol, N-methyl-2-pyrrolidone or N-ethyl-2-pyrrolidone. Further components may also, however, be water-immiscible solvents. Solvents of this kind are frequently used as film-forming assistants. Examples comprise butyl glycol acetate, butyl glycol diacetate or 2,2,4-trimethyl-1,3-pentanediol 1-isobutyrate (Texanol®).

The amount of the solvent or solvent mixture (D") is 5% to 83.9% by weight with respect to the sum of all of the components of the formulation. The amount is determined by the skilled worker in accordance with the desired properties of the coating formulation. The amount is preferably 10% to 74.8% by weight, more preferably 20% to 64.5% by weight, and, for example, 30% to 50% by weight.

Further Components (E")

Beyond components (A") to (D") it is also possible for the inventively used preparation for atmospheric corrosion control to comprise one or more auxiliaries and/or additives (E"). Such auxiliaries and/or additives serve to fine-tune the properties of the coat. Their amount does not, as a general rule, exceed 20% by weight with respect to the sum of all of the components bar the solvents, preferably not 10%.

Examples of suitable additives for use in atmospheric corrosion control comprise rheological assistants, UV absorbers, light stabilizers, free-radical scavengers, thermal-crosslinking catalysts, slip additives, polymerization inhibitors, defoamers, emulsifiers, devolatilizers, wetting agents, dispersants, adhesion promoters, flow control agents, film-forming auxiliaries, rheology control additives (thickeners), flame retardants, siccatives, antiskinning agents, other corrosion inhibitors, or waxes and matting agents. Additives of this kind are disclosed for example in "Lackadditive" [Additives for coatings], edited by Johan Bieleman, Wiley-VCH, Weinheim, N.Y., 1998, or DE-A 199 14 896, column 13 line 56 to column 15 line 54.

The preparation for implementing the method can be produced by intensively mixing all of the components of the preparation. Suitable mixing or dispersing assemblies are known to the skilled worker.

In one preferred embodiment of the invention it is possible first to prepare a dispersion from the binder system (A"), the copolymer (C), and at least part of the solvent (D"). Where the binder (A") is a primary dispersion, the binder is of course in predispersed form. Where the binder is present as solid, a solution or a secondary dispersion is pre-pared first of all. The copolymer (C) is likewise employed preferably in dispersion, emulsion or solution in a solvent. It is advantageous for this purpose to use the solutions or emulsions of the copolymers (C) that are obtained during the preparation of the copolymers (C), without the copolymers additionally being isolated beforehand.

The components (B") and any further components (E") may subsequently be dissolved or dispersed in the initial dispersion.

Implementation of the Method of Atmospheric Corrosion Control

The corrosion control coats may be all kinds of corrosion control coatings, such as primer coatings (I), intermediate coatings (II), and top coatings (III). The corrosion control coatings in question may of course also be coatings which combine the properties of at least two of these coats, or of all three coats, and so contribute to a simplified coat system. The coating in question may also be a shop coating. The skilled person understands a shop coating to be a coat that can be applied to freshly blasted steel in order to ensure corrosion control during the manufacture of steel components—thus, for example, during the welding together of parts.

The method of the invention may serve for OEM protection or else for renovation.

As a general rule it is advisable to prepare the metallic surface for the execution of the method of the invention in a step (0), although this is not absolutely necessary in every case. By surface preparation for the execution of corrosion control measures, the skilled worker understands the cleaning of the surface to remove all contaminants and also the establishment of a surface roughness appropriate to the corrosion control measure. Examples of cleaning methods comprise cleaning with water or solvents, pickling with appropriate formulations, or high-pressure cleaning. Examples of further measures comprise abrasion and, in particular, blasting of the surface, sandblasting for example, and also flame blasting as well. In such operations it is possible for all of the adhering coats to be removed, down to the bright metal. It is, however, also possible, using less intensive methods, to remove only those coats whose adhesion is poor, while leaving intact coats on the surface. One possible technique for this purpose is that known as sweep blasting.

To implement the method at least one corrosion control coat having a thickness of at least 15 μm is applied to the metallic surface, using the preparation described which can be crosslinked under atmospheric conditions.

The corrosion control coat may be applied directly to the bright metallic surface or else to a surface which has already been precoated with a corrosion control coat.

The at least one corrosion control coat is preferably a priming coat (I), which is applied either directly to the bright metal or to a metal surface bearing a shop coating. The shop coating optionally present may likewise be obtained with the formulation of the invention or else by means of a different formulation.

Application can be carried out using the customary techniques known to the skilled worker. The preparation is preferably applied by brushing or spraying.

Following its application to the surface, the applied coating cures in step (2") of the method under atmospheric conditions. At its most simple this can be accomplished by the gradual evaporation of the solvent. Depending on the nature of the binder employed, other crosslinking processes may also run their course. Details of this have already been presented above.

Depending on the thickness of the desired corrosion control coat, the entire coat can be applied in a single operation, or else two or more coats of equal kind can be applied in succession and cured in each case, in order to achieve the desired total thickness of the corrosion control coat.

Atop the primer coat (I) it is possible for further corrosion control coats to be applied. The nature and number of the further coats are determined by the skilled worker. In particular the primer coat (I) can be provided in further operations with an intermediate coat (II) and with a top coat (III). For this purpose it is possible in principle to use arbitrary coating systems, provided that no unwanted effects arise in combination with the primer coat (I). The copolymer (C) used in accordance with the invention improves the adhesion of further coats to the primer coat. With advantage it is possible to use preparations of the invention for the primer coat (I), for the intermediate coat (II) and also for the top coat.

In a further, preferred embodiment of the method first of all an integrated primer coat (Ia) is applied which can be overcoated directly with a top coat (III). An integrated primer coat thus combines the properties of the primer coat (I) and the intermediate coat (III).

In a further, preferred embodiment of the invention only a single integrated corrosion control coat (Ib) is applied, which requires no overcoating. An integrated corrosion control coat therefore combines the properties of all three coats.

The thickness of the cured, at least one corrosion control coat in accordance with the invention is at least 15 μm, preferably at least 25 μm, more preferably at least 40 μm, very particularly preferably at least 60 μm, and, for example, at least 100 μm. It is set by the skilled worker in accordance with the desired properties and end use of the coat.

Shop coatings are typically thin, 15 to 25 μm for example. The thickness of corrosion control coats which are not shop coats is generally at least 25 μm, preferably at least 40 μm, with particular preference at least 60 μm, and with very particular preference at least 100 μm. The upper limit on the overall coat thickness in atmospheric corrosion control, i.e., the thickness of all applied corrosion control coats together, is 2 mm, preferably less than 1.5 mm, more preferably less than 1 mm, very preferably less than 800 μm, and in particular less than 500 μm.

The examples which follow are intended to illustrate the invention.

Part I—Synthesis of Copolymers Used

Polymer 1:

Copolymer of 45% by Weight N-vinylimidazole, 25% by Weight Vinylphosphonic Acid, and 30% by Weight Styrene In a 2 l pilot-scale stirrer unit with anchor stirrer and internal thermometer 79 g of vinylphosphonic acid (95% strength solution) and 30.9 of dimethylethanolamine in 171.6 g of butyl glycol are gassed with nitrogen and heated to 125° C. Over the course of 5 h a feed stream 1 of 135 g of vinylimidazole and 90 g of styrene and, over the course of 6 h, a feed stream 2 of 36 g of 2,2-di(tert-butylperoxy)butane (Trigonox® D-C50; 50% strength solution in an aromatic-free hydrocarbon) in 100 g of butyl glycol are added. The reaction mixture is stirred at 125° C. for a further 2 h. Thereafter, over the course of 1 h, 6 g of 2,2-di(tert-butylperoxy)butane (Trigonox® D-C50; 50% strength solution in mineral oil) in 30 g of butyl glycol are added and the mixture is stirred for a further 3 h. In the course of cooling, 61.9 g of dimethylethanolamine, 30 g of butyl glycol and 110 g of fully demineralized water are added. This gives a brown solution.

$^1$H-NMR: residual vinylimidazole content of 5% based on vinylimidazole employed $^{31}$P-NMR: residual vinylphosphonic acid content of <1% based on vinylphosphonic acid employed Degree of neutralization of acidic groups: 25%

Polymer 2:

Copolymer of 55% by Weight N-vinylimidazole, 25% by Weight Vinylphosphonic Acid and 20% by Weight Styrene The procedure of example 1 was repeated but the amounts of vinylimidazole and styrene monomer in feed stream 1 were modified.

$^1$H-NMR: residual vinylimidazole content of <1% based on vinylimidazole employed $^{31}$P-NMR: residual vinylphosphonic acid content of <1% based on vinylphosphonic acid employed Degree of neutralization of acidic groups: 50%, Polymer 3:

Copolymer of 35% by Weight N-vinylimidazole, 35% by Weight Vinylphosphonic Acid and 30% by Weight Styrene The procedure of example 1 was repeated but the amounts of vinylimidazole and vinylphosphonic acid monomer in feed stream 1 were modified.

$^1$H-NMR: residual vinylimidazole content of 2.5% based on vinylimidazole employed $^{31}$P-NMR: residual vinylphosphonic acid content of 0.8% based on vinylphosphonic acid employed Degree of neutralization of acidic groups: 50%

Polymer 4:

Copolymer of 45% by Weight N-vinylimidazole, 25% by Weight Itaconic Acid, and 30% by Weight Styrene In a 2 l pilot-scale stirrer unit with anchor stirrer and internal thermometer 75 g of itaconic acid and 171.6 g of butyl glycol are gassed with nitrogen and heated to 125° C. Over the course of 5 h a feed stream 1 of 135 g of vinylimidazole and 90 g of styrene and, over the course of 6 h, a feed stream 2 of 36 g of 2,2-di(tert-butylperoxy)butane (Trigonox® D-C50; 50% strength solution in an aromatic-free hydrocarbon) in 100 g of butyl glycol are added. The reaction mixture is stirred at 125° C. for a further 2 h. Thereafter, over the course of 1 h, 6 g of 2,2-di(tert-butylperoxy)butane (Trigonox® D-C50; 50% strength solution in mineral oil) in 30 g of butyl glycol are added and the mixture is stirred for a further 3 h. In the course of cooling, 102.8 g of dimethylethanolamine, 50 g of butyl glycol and 80 g of fully demineralized water are added. This gives a brown solution having a solids content of 41.5%.

$^1$H-NMR: residual vinylimidazole content of <1% based on vinylimidazole employed $^1$H-NMR: residual itaconic acid content of <1% based on itaconic acid employed Degree of neutralization of acidic groups: 0%

Polymer 5:

Copolymer of 40% by weight N-vinylimidazole, 25% by weight vinylphosphonic acid, 30% by weight styrene and 5% by weight 2-hydroxyethyl acrylate The procedure of example 1 was repeated but the amount of vinylimidazole monomer in feed stream 1 was modified and 15 g of hydroxyethyl acrylate in feed stream 1 were added.

$^1$H-NMR: residual vinylimidazole content of 1.1% based on vinylimidazole employed $^{31}$P-NMR: residual vinylphosphonic acid content of <0.1% based on vinylphosphonic acid employed Degree of neutralization of acidic groups: 50%

Polymer 6:

Copolymer of 45% by Weight N-vinylimidazole, 25% by Weight Acrylic Acid, and 30% by Weight Styrene In a 2 l pilot-scale stirrer unit with anchor stirrer and internal thermometer 171.6 g of butyl glycol are gassed with nitrogen and heated to 125° C. Over the course of 5 h a feed stream 1 of 135 g of vinylimidazole, 90 g of styrene, and 46.4 g of dimethylethanolamine and a feed stream 2 of 75 g of acrylic acid and, over the course of 6 h, a feed stream 3 of 36 g of 2,2-ditert-butylperoxy)butane (Trigonox® D-C50; 50% strength solution in an aromatic-free hydrocarbon) in 100 g of butyl glycol are added. The reaction mixture is stirred at 125° C. for a further 2 h. Thereafter, over the course of 1 h, 6 g of 2,2-di(tert-butylperoxy)butane (Trigonox® D-C50; 50% strength solution in mineral oil) in 30 g of butyl glycol are added and the mixture is stirred for a further 3 h. In the course of cooling, 46.4 g of dimethylethanolamine, 30 g of butyl glycol and 40 g of fully demineralized water are added. This gives a brown solution.

$^1$H-NMR: residual vinylimidazole content of <0.1% based on vinylimidazole employed $^{31}$P-NMR: residual acrylic acid content of <0.1% based on acrylic acid employed Degree of neutralization of acidic groups: 50%

Polymer 7:

Copolymer of 45% by Weight N-vinylimidazole, 25% by Weight 2-acrylamido-2-methyl-1-propanesulfonic Acid, and 30% by Weight Styrene In a 2 l pilot-scale stirrer unit with anchor stirrer and internal thermometer 171.6 g of butyl glycol are gassed with nitrogen and heated to 125° C. Over the course of 5 h a feed stream 1 of 75 g of 2-acrylamido-2-methyl-1-propanesulfonic acid, 135 g of vinylimidazole, 90 g of styrene, 30 g of butyl glycol, and 32.2 g of dimethylethanolamine and a feed stream 2 of 36 g of 2,2-di(tert-butylperoxy)butane (Trigonox® D-C50; 50% strength solution in an aromatic-free hydrocarbon) in 100 g of butyl glycol are added. The reaction mixture is stirred at 125° C. for a further 2 h. Thereafter, over the course of 1 h, 6 g of 2,2-di(tert-butylperoxy)butane (Trigonox® D-C50; 50% strength solution in mineral oil) in 30 g of butyl glycol are added and the mixture is stirred for a further 3 h. In the course of cooling, 46.4 g of dimethylethanolamine, 60 g of butyl glycol and 40 g of fully demineralized water are added. This gives a brown solution.

$^1$H-NMR: residual vinylimidazole content of <1% based on vinylimidazole employed $^{31}$P-NMR: residual 2-acrylamido-2-methyl-1-propanesulfonic acid content of <1% based on 2-acrylamido-2-methyl-1-propanesulfonic acid employed Degree of neutralization of acidic groups: 100%

Examples 1 and 4 were also repeated with other degrees of neutralization. The residual monomer content as a function of the degree of neutralization is summarized for examples 1 to 7 in table 1.

For comparative purposes the following polymers were employed:

Polymer V1:

Polyvinylimidazole

A 1 liter round-bottomed flask is charged with 276 g of fully demineralized water and this initial charge is heated to 80° C. Over 3.5 h, simultaneously, a feed stream 1 of 200 g of vinylimidazole, a feed stream 2 of 8.0 g of 2,2'-azobis(2-methylpropaneimidamide) dihydrochloride in 100 g of fully demineralized water, and a feed stream 3 of 4.0 g of mercaptoethanol in 100 g of fully demineralized water are run in. The mixture is stirred at 80° C. for 1 h and then over 1 h a feed stream 4 of 1.0 g of 2,2'-azobis(2-methylpropaneimidamide) dihydrochloride in 20 g of fully demineralized water is added. The mixture is stirred at reaction temperature for a further 2 h and, after cooling, gives a clear brownish polymer solution having a solids content of 30.4% and a K value of 18.3.

Polymer V2:

Polyvinylimidazole-polyethylenoxide Graft Copolymer

In a 2 l pilot-scale stirring unit with anchor stirrer and internal thermometer 420 g of polyethylene glycol with $M_n$ 4000 g/mol (Pluriol® E 4000) are gassed with nitrogen and heated to 100° C. Over the course of 6 h a feed stream 1 of 280 g of vinylimidazole and, over the course of 7 h, a feed stream 2 of 6.3 g of tert-butyl peroctoate in 20 g of dipropylene glycol are added. The reaction mixture is stirred at 100° C. for a further 2 h. Thereafter three times 2.1 g of tert-butyl peroctoate are added with stirring for 2 h in each case. After cooling, the solution is adjusted to a solids content of 25% using 700 g of fully demineralized water. This gives a slightly turbid brown solution. K value=24.4 (1% strength in fully demineralized water).

Polymer V3:
Amidated Polyethylenimine.

60.45 g of polyethylenimine ($M_n$ 800 g/mol) were heated to 120° C. under nitrogen and 84.74 g of oleic acid were added dropwise. The reaction mixture was stirred at 160° C. for 12 hours and the water formed was removed by distillation. Conversion: 97% (determined by means of acid number and amine number).

with cooling jacket, and mixed with 1.8-2.2 mm SAZ glass beads. The millbase was ground for 1 h 30 minutes. Subsequently the millbase was separated from the glass beads.

Added to the millbase with stirring, in the order stated, were 5.9 parts by weight of a blocked hexamethylene diisocyanate (Desmodur® VP LS 2253, Bayer AG) and 0.4 part by weight of a commercial tin-free crosslinking catalyst (Borchi® VP 0245, Borchers GmbH).

Base Formula for Coil-Coating Material (Aqueous) Based on Acrylate Binder

The crosslinkable binder used was an anionically amine-stabilized, aqueous acrylate dispersion (solids content 30% by weight) formed from n-butyl acrylate, styrene, acrylic acid, and hydroxypropyl methacrylate as principal monomers.

In a suitable stirred vessel, in the order stated, 18.8 parts by weight of the acrylate dispersion, 4.5 parts by weight of a

TABLE 1

Variation in degree of neutralization during polymerization and effect on residual monomer content

| Copolymer of | Monomers | | | | Degree of neutralization during the polymerization (%) | Residual VI based on VI employed | Residual VPA based on VPA employed |
| --- | --- | --- | --- | --- | --- | --- | --- |
| | A | B | C | D | | | |
| Example 1 | 45% VI | 25% VPA | 30% S | — | 100 | 16 | 1.6 |
| | " | " | " | — | 50 | 5 | <1 |
| | " | " | " | — | 25 | <1 | <1 |
| | " | " | " | — | 0 | 6 | 8 |
| Example 2 | 55% VI | 25% VPA | 20% S | — | 50 | <1 | <1 |
| Example 3 | 35% VI | 35% VPA | 30% S | — | 50 | 2.5 | <1 |
| Example 4 | 45% VI | 25% IA | 30% S | — | 50 | 32 | <1 |
| | " | " | " | — | 0 | <1 | <1 |
| Example 5 | 40% VI | 25% VPA | 30% S | 5% HEA | 50 | 1 | <1 |
| Example 6 | 45% VI | 25% AA | 30% S | — | 50 | <1 | <1 |
| Example 7 | 45% VI | 25% AMPS | 30% S | — | 100 | <1 | <1 |

Key to abbreviations: VI: vinylimidazole; VPA: vinylphosphonic acid; S: styrene; IA: itaconic acid; AA: acrylic acid; AMPS: 2-acrylamido-2-methyl-1-propanesulfonic acid; HEA: hydroxyethyl acrylate Part II—Performance Tests Using the copolymers obtained, performance experiments were conducted.

II-1: Integrated Corrosion Control Coats

Tests were carried out in 3 different coil-coating materials, based on epoxides, acrylates, and polyurethanes Base Formula for Coil-Coating Material (Organic) Based on Epoxy Binders For the formulation for producing an integrated pretreatment layer the following components were employed:

| Component | Description | Quantity [parts by weight] |
| --- | --- | --- |
| Binder with crosslinking groups | Epoxy binder based on bisphenol A (molecular weight 1000 g/mol, viscosity 13 dPas/s, and 50% solids content) | 26.9 |
| Fillers | Hydrophilic pyrogenic silica (Aerosil ® 200 V, Degussa) | 0.16 |
| | Finntalk M5 talc | 2.9 |
| | White pigment titanium rutile 2310 | 10.8 |
| | Silica modified with calcium ions (Shieldex ®, Grace Division) | 3.0 |
| | Zinc phosphate (Sicor ® ZP-BS-M, Waardals Kjemiske Fabriken) | 4.1 |
| | Black pigment (Sicomix ® Schwarz, BASF AG) | 1.0 |
| Solvent | Butyl glycol | 5.0 |

The components were mixed in the stated order in a suitable stirring vessel and predispersed for ten minutes using a dissolver. The resulting mixture was transferred to a beadmill with cooling jacket and mixed with 1.8-2.2 mm SAZ glass beads. The millbase was ground for 45 minutes. Then the millbase was separated from the glass beads.

Added to the millbase with stirring, in the order stated, were 27 parts by weight of the acrylate dispersion, 1.0 part by weight of a defoamer, 3.2 percent of a blocked sulfonic acid, 1.5 parts by weight of a defoamer, and 1.0 part by weight of a flow control assistant.

Addition of the Copolymers (C) Used in Accordance with the Invention to the Coating Material The coil-coating materials described were each admixed with 5% by weight of the copolymers (C) synthesized as in examples 1 to 7 (calculated as solid copolymer with respect to the solid components of the formulation). In each case the solutions containing butyl glycol, as obtained in the examples, were employed directly.

dispersing additive, 1.5 parts by weight of a flow control agent with defoamer action, 5.5 parts by weight of a melamine resin as crosslinker (Luwipal® 072, BASF AG), 0.2 part by weight of a hydrophilic pyrogenic silica (Aerosil® 200V from Degussa), 3.5 parts by weight of Finntalk M5 talc, 12.9 parts by weight of titanium rutile 2310 white pigment, 8.0 parts by weight of the acrylate dispersion, 3.5 parts by weight of silica modified with calcium ions (Shieldex® from Grace Division), 4.9 parts by weight of zinc phosphate (Sicor® ZP-BS-M from Waardals Kjemiske Fabriken), 1.2 parts by weight of black pigment (Sicomix® Schwarz from BASF AG) were mixed and the mixture was predispersed for ten minutes using a dissolver. The resulting mixture was transferred to a beadmill with cooling jacket and mixed with 1.8-2.2 mm SAZ glass beads. The millbase was ground for 45 minutes. Then the millbase was separated from the glass beads.

Coating of Steel and Aluminum Panels

The coating experiments were carried out using galvanized steel plates of type Z, thickness 0.9 mm (OEHDG 2, Chemetall) and aluminum plates AlMgSi (AA6016, Chemetall). These plates had been cleaned beforehand by known methods. The coil-coating materials described were applied using rod-type doctor blades in a wet film thickness which resulted, after curing in a continuous dryer at a forced-air temperature of 185° C. and a substrate temperature of 171° C., in coatings with a dry layer thickness of 6 μm.

For comparison purposes, coatings without the addition of the copolymers were also produced.

Test of Corrosion Inhibition Effect

In order to test the corrosion inhibition effect of the coatings of the invention, the galvanized steel sheets were subjected for 10 weeks to the VDA climatic cycling test (VDA [German Association of the Automotive Industry] test sheet 621-415 February 82).

In this test (see FIG. 4) the samples are first exposed to a salt spray test for one day (5% NaCl solution, 35° C.) and subsequently exposed 3× in alternation to humid conditions (40° C., 100% relative humidity) and dry conditions (22° C., 60% relative humidity). A cycle is ended with a 2-day dry-conditions phase. One cycle is depicted schematically in FIG. 4.

A total of 10 such exposure cycles are carried out in succession.

After the end of the corrosion exposure, steel plates were evaluated visually by comparison with predefined standards. Assessments were made both of the formation of corrosion products on the undamaged coating area, and of the propensity for subfilm corrosion at the edge and at the scribe mark.

The samples are evaluated on the basis of a comparison with the comparison sample without addition of the corrosion-inhibiting copolymers.

The corrosion inhibition effect of the steel plates was additionally performed by means of a salt spray test in accordance with DIN 50021.

Aluminum plates were subjected to the ethanoic acid salt spray test ESS (DIN 50021, June 88). After the end of corrosion exposure the panels were evaluated visually. In this case evaluation was made of the areas of circular delamination over the coating area as a whole.

For all the tests the coating films were inscribed; in the case of the steel plates, inscribing took place through the zinc layer and down to the steel layer.

For the evaluation of the samples the following scores were awarded:
0 corrosion damage as for the blank sample
+ less corrosion damage than the blank sample
++ substantially less corrosion damage than the blank sample
− more corrosion damage than the blank sample The results of the tests are depicted schematically in tables 2 to 4.

Mechanical Tests on the Coating Film:

The mechanical tests were carried out using the coated steel plates described above.

T-Bend Test:

Procedure according to DIN EN 13523-7. The test method serves for determining the resistance of an organic coating on a metallic substrate to cracking when bent around defined radii.

The tests are carried out at room temperature. For this, test strips are cut from the coated metal. The strips are bent—with the coated side facing outward—in stages, in accordance with the procedures described in the standard, to form a spiral, as shown diagrammatically in FIG. 5.

The sheet, then, is bent multiply, the bending radii decreasing with each additional bending operation. The bend points are examined for cracks in each case immediately after bending.

The result reported is the smallest bending radius by which the metal plate can be bent without cracks appearing. The results are expressed in T, in each case rounded up to half or whole T. The T measurements are subject to the following relationship:

$$T = r/d$$

r = bending radius (internal) in cm
d = plate thickness in cm

The smaller the T value, the better the bending resistance of the coating material.

Coating Adhesion on Bending (T-Tape Test):

Procedure according to DIN EN 13523-7. The test method serves for determining the adhesion of coating materials under bending stress at room temperature (20° C.). For this purpose a test plate is bent in stages to a spiral as described above.

To each of the bend points, immediately after bending, there is adhered a transparent adhesive tape with a defined bonding strength (25 mm wide, with a bond strength of (10±1) N per 25 mm of width, tested to IEC 60454-2:1994, e.g. Tesa® 4104). Thereafter the adhesive tape is removed again and the metal surface is examined to determine whether the adhesive tape has pulled coating material from the surface. The result reported is the smallest bending radius by which the metal plate can be bent without coating material being pulled off in the adhesive tape test. The results are expressed in T, in each case rounded up to half or whole T. The T measurements are subject to the above relationship.

The smaller the T-tape value, the better the adhesive strength of the coating material on bending.

MEK Test:

Procedure according to EN ISO 13523-11. This method characterizes the degree of crosslinking of coating films by exposure to solvents.

A cotton compress soaked with methyl ethyl ketone is rubbed over the coating film under a defined applied weight. The number of double rubs until damage to the coating film first becomes visible is the MEK value to be reported.

The results of the mechanical tests are also comprised in tables 2 to 4.

TABLE 2

Test of the copolymers in aqueous polyurethane coating material

| Example No. | Copolymer employed | Monomers | | | | T-Bend | T-Tape | MEK | Steel panel, galvanized Climatic cycling test | Salt spray test | Aluminum panel Ethanoic salt spray test |
| --- | --- | --- | --- | --- | --- | --- | --- | --- | --- | --- | --- |
| | | A | B | C | D | | | | | | |
| Example 1 | Polymer 1 | 45% VI | 25% VPA | 30% S | — | 2 | 0.5 | 90 | + | 0 | + |
| Example 2 | Polymer 2 | 55% VI | 25% VPA | 20% S | — | 2 | 1 | 85 | + | + | + |

TABLE 2-continued

Test of the copolymers in aqueous polyurethane coating material

| Example No. | Copolymer employed | Monomers A | B | C | D | T-Bend | T-Tape | MEK | Steel panel, galvanized Climatic cycling test | Salt spray test | Aluminum panel Ethanoic salt spray test |
|---|---|---|---|---|---|---|---|---|---|---|---|
| Example 3 | Polymer 3 | 35% VI | 35% VPA | 30% S | — | 2 | 1 | 98 | + | + | − |
| Example 4 | Polymer 4 | 45% VI | 25% IA | 30% S | — | 2 | 0 | 80 | + | + | − |
| Example 5 | Polymer 5 | 40% VI | 25% VPA | 30% S | 5% HEA | 2 | 1 | 75 | − | 0 | + |
| Example 6 | Polymer 6 | 45% VI | 25% AA | 30% S | — | 2 | 1.5 | 85 | + | 0 | − |
| Example 7 | Polymer 7 | 45% VI | 25% AMPS | 30% S | — | 2 | 1.5 | 30 | 0 | 0 | − |
| Comparative 1 | None | — | — | — | — | 2.5 | 1.5 | 100 | 0 | 0 | 0 |
| Comparative 2 | Polymer V1 | 100% VI | — | — | — | >3 | >3 | 18 | − | Was not tested | Was not tested |

Key to abbreviations: VI: vinylimidazole; VPA: vinylphosphonic acid; S: styrene; IA: itaconic acid; AA: acrylic acid; AMPS: 2-acrylamido-2-methyl-1-propanesulfonic acid; HEA: hydroxyethyl acrylate

TABLE 3

Test of the copolymers in aqueous acrylate coating material

| Example No. | Copolymer employed | Monomers A | B | C | D | T-Bend | T-Tape | MEK | Steel panel, galvanized Climatic cycling test | Salt spray test | Aluminum panel Ethanoic salt spray test |
|---|---|---|---|---|---|---|---|---|---|---|---|
| Example 8 | Polymer 1 | 45% VI | 25% VPA | 30% S | — | 3 | 2.5 | 20 | 0 | + | + |
| Example 9 | Polymer 2 | 55% VI | 25% VPA | 20% S | — | 3 | 2.5 | 15 | + | + | + |
| Example 10 | Polymer 3 | 35% VI | 35% VPA | 30% S | — | 3 | 2.5 | 10 | 0 | + | + |
| Example 11 | Polymer 4 | 45% VI | 25% IA | 30% S | — | 3 | 3 | 15 | 0 | − | + |
| Example 12 | Polymer 5 | 40% VI | 25% VPA | 30% S | 5% HEA | 3 | 2.5 | 20 | + | + | + |
| Example 13 | Polymer 6 | 45% VI | 25% AA | 30% S | — | 3 | 2.5 | 40 | − | − | + |
| Example 14 | Polymer 7 | 45% VI | 25% AMPS | 30% S | — | 3 | 3 | 50 | − | − | − |
| Comparative 3 | None | — | — | — | — | 3 | 3 | 15 | 0 | 0 | 0 |
| Comparative 4 | Polymer V2 | VI-PEO graft copolymer | | | | >3 | 3 | 10 | − | 0 | − |

Key to abbreviations: VI: vinylimidazole; VPA: vinylphosphonic acid; S: styrene; IA: itaconic acid; AA: acrylic acid; AMPS: 2-acrylamido-2-methyl-1-propanesulfonic acid; HEA: hydroxyethyl acrylate

TABLE 4

Test of the copolymers in organic epoxy coating material

| Example No. | Copolymer employed | Monomers A | B | C | D | T-Bend | T-Tape | MEK | Steel panel, galvanized Climatic cycling test | Salt spray test | Aluminum panel Ethanoic salt spray test |
|---|---|---|---|---|---|---|---|---|---|---|---|
| Example 15 | Polymer 1 | 45% VI | 25% VPA | 30% S | — | 2.5 | 2.5 | 10 | + | + | − |
| Example 16 | Polymer 2 | 55% VI | 25% VPA | 20% S | — | 2.5 | 1.5 | 9 | + | + | − |
| Example 17 | Polymer 3 | 35% VI | 35% VPA | 30% S | — | 2.5 | 1.5 | 14 | + | + | − |
| Example 18 | Polymer 4 | 45% VI | 25% IA | 30% S | — | 2.5 | 1.5 | 13 | + | + | − |
| Example 19 | Polymer 5 | 40% VI | 25% VPA | 30% S | 5% HEA | 2.5 | 1.5 | 12 | − | + | − |
| Example 20 | Polymer 6 | 45% VI | 25% AA | 30% S | — | 2.5 | 2 | 19 | + | + | − |
| Example 21 | Polymer 7 | 45% VI | 25% AMPS | 30% S | — | 2.5 | 1.5 | 13 | + | + | − |
| Comparative 5 | None | — | — | — | — | 2.5 | 1.5 | 18 | 0 | 0 | 0 |
| Comparative 6 | Polymer V3 | Amidated polyethylenimine | | | | 3 | 3 | 4-9 | − | Was not tested | − |

Key to abbreviations: VI: vinylimidazole; VPA: vinylphosphonic acid; S: styrene; IA: itaconic acid; AA: acrylic acid; AMPS: 2-acrylamido-2-methyl-1-propanesulfonic acid; HEA: hydroxyethyl acrylate The examples show that with the copolymers used in accordance with the invention it is possible to achieve marked improvements in corrosion control and/or in the mechanical properties of the coating films. The extent depends in each case on the metallic surface selected and on the coating system selected.

In an aqueous polyurethane coating material (see table 2), in particular, the mechanical properties of the coating material are significantly improved when the panel is bent. The crack resistance (T-bend) and especially the adhesion (T-tape) of the coating material increase significantly with the polymers used in accordance with the invention (smaller values denote in each case better values). With polyvinylimidazole alone (comparative example 2) the mechanical properties of the coating material are impaired. The corrosion control properties are generally improved, especially on galvanized steel.

In the case of aqueous acrylate coating materials the improvement in corrosion control properties is particularly pronounced on aluminum. The polymer also has the effect of producing a slight improvement in adhesion.

In the case of epoxy coating materials there is virtually no change in the mechanical properties. On steel a significant improvement in corrosion control is achieved.

II-2: Atmospheric Corrosion Control

For performance testing, a corrosion control formulation based on a commercial aqueous styrene-acrylate dispersion for paints (Acronal® Optive 410, BASF Corp.) was used. The dispersion employed has the following properties:

| | |
|---|---|
| Solids content | 49-51% |
| pH | 7.5-8.5 |
| Brookfield viscosity | 500-1000 cps |
| Density | 1.06 g/cm$^3$ |
| MFFT (Minimum Film Forming Temperature (to ASTM D 2354)) | about 12° C. |
| Particle size | about 110 nm |

The formulations of the invention were produced by adding 3% by weight of each of the copolymers to the aforementioned styrene-acrylate dispersion (calculated as solid copolymer relative to the solids fraction of the dispersion). This was done using the above-described copolymer solutions containing butyl glycol.

For comparison purposes a sample without addition of a polymeric corrosion inhibitor was produced.

Guideline Formulation for Corrosion Control Primers

Using the resultant aqueous dispersions of styrene-acrylate copolymers with and without addition of corrosion control polymers, preparations were produced in accordance with the following instructions:

393.4 g of the respective aqueous polymer dispersion are admixed with 2.2 g of a commercial defoamer for coating materials (mixture of polysiloxanes and hydrophobic solids in polyglycol, BYK® 022, Byk), after which a mixture consisting of 0.6 g of an anionic dispersant (acidic phosphoric ester of a fatty alcohol alkoxylate; Lutensit® A-EP, BASF AG), 11.0 g of concentrated ammonia, and 58.6 g of water are added by means of a Dispermat. Incorporated additionally, with stirring, is a mixture of 7.2 g of phenoxypropanol (film-forming assistant) and 7.2 g of benzine 180-210° C. (film-forming assistant).

Added subsequently are 85.0 g of a hematite pigment (Bayferrox® 130 M, Lanxess), 82.1 g of an anticorrosion pigment based on zinc phosphate (Heucophos®ZPZ, modified zinc phosphate, Heubach), 36.0 g of magnesium silicate (filler; talc 20 M 2, Luzenac), and 127.8 g of a filler based on barium sulfate and zinc sulfide (30% by weight ZnS) (Litopone® L). The whole mixture is dispersed with glass beads (ø 3 mm) for at least 30 minutes.

Thereafter, with further stirring, a further 166.4 g of polymer dispersion, 1.9 g of BYK® 022, and 3.7 g of a 1:1 mixture of water and a commercial corrosion inhibitor (corrosion inhibitor L 1, Erbslöh) are added and the glass beads are removed by sieving.

To finish, the batch is admixed with a mixture of 3.7 g of a 25% strength solution of a commercial, urethane-based thickener (Collacral PU 85, BASF AG) and 13.2 g of butyl glycol (solvent) and also, if appropriate, the pH is adjusted to approximately 9.5 using concentrated ammonia. This gives 1000 g of a corrosion control primer with a solids content of 61% and a pigment/volume concentration (PVC) of 23%.

Application of the Formulations to Steel Panels, Preparation for the Salt Spray Test The primers under test were diluted with fully demineralized water to the desired viscosity (300 to 1000 mPas (ICI with Rotothinner sphere)) and drawn down using a box-section doctor blade onto a cleaned, non-galvanized steel panel (200×80×0.9 mm); the slot size is selected so as to give a dry film thickness of 60-85 µm.

After six days of drying at room temperature and one day of thermal conditioning at 50° C., the reverse side of the test panel was coated with a solvent-based coating material, for protection from corrosion, and the edges were masked off with tesafilm tape.

To end with, the metal test panel was inscribed down to the substrate, using a scorer, on the side coated with the primer under test.

Salt Spray Test/Evaluation

Using the samples, a salt spray test was conducted in accordance with DIN EN ISO 7253 (duration of test: 240 h).

Evaluation took place here by visual comparison of tested samples with the prescribed standards of ISO 7253, For the Evaluation of the Corrosion Behavior:

Surface Corrosion

Proportion of the surface area corroded in relation to the total surface area of the metal test panel, in [%]

Cross-Cut (in Accordance with DIN EN ISO 2409)

The cross-cut test is used to determine the adhesion of the coating to the substrate. For this purpose a lattice comprising a number of cuts (at a linear distance of 2 mm) is incised into the coating after the salt spray test, the lattice is overstuck with adhesive tape, and then the adhesive tape is removed. An evaluation was made of the appearance of the lattice after the adhesive tape has been removed. Scores of 0 to 5 are awarded, in accordance with the following scale:

GT 0 The cut edges are completely smooth and none of the squares of the lattice has undergone delamination.

GT 1 The coating has undergone a delamination along the cut edges, but the delaminated area is not substantially greater than 15% of the cross-cut area.

GT 2 The delaminated lattice area is significantly greater than 15% but not substantially greater than 35%.

GT 3 The coating has undergone partial or full delamination in broad strips along the cut edges, or some squares have undergone partial or complete delamination.

GT 4 The cross-cut area affected, however, is not substantially greater than 65%.

GT 5 Any delamination that can be classified as more severe than GT 4.

The results of the tests are compiled in table 5. Photographs of the sample surface of the blank sample end of coating materials with polymers 4, 6, and 7 are collected in FIG. 3.

The data in table 5 and also FIG. 3 show that the corrosion is significantly inhibited by the copolymers (polymers 4, 6 and 7) used in accordance with the invention, in comparison to a sample without polymeric corrosion inhibitors. Whereas for the comparison sample without corrosion inhibitor 50-80% of the surface has undergone corrosion, the figure for the inventive examples is only 10% to 20% of the surface.

TABLE 5

Compilation of the results in the salt spray test

| | Blank sample | Polymer 4 | Polymer 6 | Polymer 7 |
|---|---|---|---|---|
| Polymer corrosion inhibitor | None | VI/IA/S (45/25/30) | VI/AA/S (45/25/30) | VI/AMPS/S (45/25/30) |
| pH of formulation | 8.5 | 8.8 | 8.9 | 8.6 |
| Film thickness [µm] | 63-88 | 65-76 | 63-84 | 69-80 |

TABLE 5-continued

Compilation of the results in the salt spray test

|  | Blank sample | Polymer 4 | Polymer 6 | Polymer 7 |
|---|---|---|---|---|
| Surface corrosion | 50-80% | about 10% | 10-20% | about 20% |
| Cross-cut after salt spray test | Gt 5 | Gt 0 | Gt 0-1 | Gt 0-1 |

The invention claimed is:

1. A method of applying a corrosion control coat to a metallic surface comprising applying a layer of a preparation comprising a curable and/or crosslinkable binder system (A); a component (B) selected from the group consisting of finely divided fillers, pigments, dyes, and mixtures thereof; and a polymeric corrosion preventative (C), wherein said polymeric corrosion preventative is a copolymer (C) synthesized from the following monomeric building blocks:
(C1) 20% to 70% by weight of N-vinylimidazole;
(C2) 10% to 50% by weight of at least one monoethylenically unsaturated monomer comprising at least one acid group, wherein said at least one acid group is selected from the group consisting of carboxylic acid groups, phosphoric acid groups, phosphonic acid groups, and sulfonic acid groups;
(C3) 10% to 50% by weight of at least one monoethylenically unsaturated aromatic hydrocarbon; and
(C4) 0% to 25% by weight of non-(C1 to C3) ethylenically unsaturated monomers;
to said metallic surface, wherein the amount of each monomeric building block is based on the total amount of all monomeric building blocks in said copolymer.

2. The method of claim 1, wherein (C3) comprises styrene.

3. The method of claim 1, wherein said at least one acid group is wholly or partially neutralized.

4. The method of claim 1, wherein the amount of (C1) is in the range of from 25% to 65% by weight, the amount of monomer (C2) is in the range of from 15% to 45% by weight, and the amount of monomer (C3) is in the range of from 15% to 45% by weight.

5. The method of claim 1, wherein the amount of (C4) is in the range of from 0.1% to 25% by weight.

6. The method of claim 5, wherein (C4) comprises a monoethylenically unsaturated monomer comprising OH groups.

7. The method of claim 1, wherein said metallic surface is a surface of steel, zinc, zinc alloy, aluminum, or aluminum alloy.

8. The method of claim 1, wherein said preparation comprises from 20% to 70% by weight of a thermally and/or photochemically crosslinkable binder system (A); from 20% to 70% by weight of at least one inorganic finely divided filler having an average particle size of less than 10 μm (B); from 0.25% to 40% by weight of said polymeric corrosion preventative (C), and optionally a solvent (D); and wherein said method comprises thermally and/or photochemically crosslinking the applied layer to form an integrated pretreatment layer having a thickness in the range of from 1 to 25 μm.

9. The method of claim 8, wherein said acid groups of (C2) are phosphoric acid groups and/or phosphonic acid groups.

10. The method of claim 9, wherein (C2) comprises vinylphosphonic acid.

11. The method of claim 8, wherein said metallic surface is the surface of electrolytically galvanized or hot dip galvanized steel.

12. The method of claim 8, wherein said metal surface is the surface of a coil metal and said integrated pretreatment layer is applied by means of a continuous process.

13. The method of claim 12, wherein said method is performed by means of a rolling, spraying, or dipping process.

14. The method of claim 8, wherein said metallic surface is cleaned prior to applying said preparation.

15. The method of claim 8, wherein said crosslinking is performed thermally, wherein said thermally and/or photochemically crosslinkable binder system (A) comprises a crosslinker selected from the group consisting of polyesters, epoxy resins, polyurethanes, and polyacrylates, and wherein at least one additional crosslinker is employed.

16. The method of claim 15, wherein said crosslinker is a blocked isocyanate or a reactive melamine resin.

17. The method of claim 15, wherein said crosslinking is performed at a temperature in the range of from 100° C. to 250° C.

18. The method of claim 8, wherein the thickness of said integrated pretreatment layer is in the range of from 3 to 15 μm.

19. A shaped article comprising a metallic surface coated with an integrated pretreatment layer having a thickness in the range of from 1 to 25 μm obtained by the method of claim 8.

20. The shaped article of claim 19, wherein said metallic surface is steel, zinc, zinc alloy, aluminum, or aluminum alloy.

21. The shaped article of claim 20, wherein said integrated pretreatment layer is overcoated with at least one coating film.

22. The shaped article of claim 21, wherein said shaped article is an automobile body or bodywork component.

23. The shaped article of claim 22, wherein said automobile body or bodywork component is a structural element for paneling.

24. The method of claim 1, wherein said preparation is curable under atmospheric conditions and comprises from 15% to 70% by weight of at least one binder system curable under atmospheric conditions (A); from 1% to 70% by weight of at least one component selected from the group consisting of finely divided fillers, pigments, dyes, and mixtures thereof (B); from 0.1% to 40% by weight of said polymeric corrosion preventative (C), and from 5% to 83.9% by weight of at least one solvent (D); wherein said method further comprises curing the applied layer under atmospheric conditions to form a corrosion control coat having a thickness of at least 15 μm, and wherein said metallic surface is bright or precoated.

25. The method of claim 24, wherein said acid groups of (C2) are carboxyl groups and/or sulfonic acid groups.

26. The method of claim 25, wherein (C2) comprises itaconic acid.

27. The method of claim 24, wherein said binder system is selected from the group consisting of aqueous or predominantly aqueous dispersions of polyacrylates and/or styrene-acrylate copolymers, styrene-alkadiene polymers, polyurethanes, alkyd resins, and combinations thereof.

28. The method of claim 24, wherein said metallic surface is the surface of metallic structures or metal constructions.

29. The method of claim 28, wherein said metallic surface is the surface of bridges, power masts, tanks, containers, chemical plants, buildings, roofs, pipes, couplings, flanges, ships, cranes, posts, or bulkheads.

30. The method of claim 24, wherein the thickness of the cured corrosion control coat is at least 25 μm.

31. A copolymer comprising at least three different monomeric units, wherein said copolymer is synthesized from the following monomeric building blocks:

(C1) 20% to 70% by weight of N-vinylimidazole;
(C2) 10% to 50% by weight of at least one monoethylenically unsaturated monomer comprising at least one acid group, wherein said at least one acid group is selected from the group consisting of carboxyl groups, phosphoric acid groups, phosphonic acid groups, and sulfonic acid groups;
(C3) 10% to 50% by weight of at least one monoethylenically unsaturated aromatic hydrocarbon; and
(C4) 0% to 25% by weight of non-(C1 to C3) ethylenically unsaturated monomers;
wherein the amount of each monomeric building block is based on the total amount of all monomeric building blocks in said copolymer.

32. The copolymer of claim 31, wherein (C3) comprises styrene.

33. The copolymer of claim 31, wherein said at least one acid group is a phosphoric acid group and/or a phosphonic acid group.

34. The copolymer of claim 33, wherein (C2) comprises vinylphosphonic acid.

35. The copolymer of claim 31, wherein said at least one acid group is a carboxyl group and/or a sulfonic acid group.

36. The copolymer of claim 35, wherein (C2) comprises itaconic acid.

37. The copolymer of claim 31, wherein said at least one acid group is wholly or partly neutralized.

38. The copolymer of claim 31, wherein the amount of (C1) is in the range of from 25% to 65% by weight, the amount of (C2) is in the range of from 15% to 45% by weight, and the amount of monomer (C3) is in the range of from 15% to 45% by weight.

39. The copolymer of claim 31, wherein the amount of (C4) is in the range of from 0.1% to 25% by weight.

40. The copolymer of claim 39, wherein (C4) comprises a monoethylenically unsaturated monomer comprising OH groups.

41. A preparation for application to a metallic surface as a corrosion control coat, comprising at least one curable or crosslinkable binder system (A); a component (B) selected from the group consisting of finely divided fillers, pigments, dyes, and mixtures thereof; and a polymeric corrosion preventative (C), wherein said polymeric corrosion preventative is the copolymer of claim 31.

42. The preparation of claim 41, comprising from 20% to 70% by weight of a thermally and/or photochemically crosslinkable binder system (A), from 20% to 70% by weight of at least one inorganic finely divided filler having an average particle size of less than 10 μm, from 0.25% to 40% by weight of said copolymer (C), and optionally a solvent, wherein the weight percentages of (A), (B), (C), and (D) are based on the sum of all of the components except the solvent.

43. The preparation of claim 41, comprising from 15% to 70% by weight of a binder system curable under atmospheric conditions (A), from 1% to 70% by weight of at least one component selected from the group consisting of finely divided fillers, pigments, dyes, and mixtures thereof (B), from 0.1% to 40% by weight of said copolymer (C), and from 5% to 83.9% by weight of at least one solvent (D), wherein the weight percentages of (A), (B), (C), and (D) are based on the sum of all of the components.

* * * * *